US012748357B2

(12) United States Patent
Isono et al.

(10) Patent No.: US 12,748,357 B2
(45) Date of Patent: Sep. 29, 2026

(54) TONER

(71) Applicant: CANON KABUSHIKI KAISHA, Tokyo (JP)

(72) Inventors: Naoya Isono, Shizuoka (JP); Kenji Ookubo, Shizuoka (JP); Masaya Komuro, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 515 days.

(21) Appl. No.: 18/350,309

(22) Filed: Jul. 11, 2023

(65) Prior Publication Data

US 2024/0019792 A1 Jan. 18, 2024

(30) Foreign Application Priority Data

Jul. 15, 2022 (JP) ................................ 2022-113902

(51) Int. Cl.
*G03G 9/08* (2006.01)
*G03G 9/087* (2006.01)

(52) U.S. Cl.
CPC ....... *G03G 9/0825* (2013.01); *G03G 9/08711* (2013.01); *G03G 9/08773* (2013.01)

(58) Field of Classification Search
CPC ............ G03G 9/0825; G03G 9/08711; G03G 9/08773
See application file for complete search history.

(56) References Cited

U.S. PATENT DOCUMENTS

| | | | |
|---|---|---|---|
| 7,393,912 | B2 | 7/2008 | Mihara |
| 7,399,568 | B2 | 7/2008 | Fuku |
| 7,452,960 | B2 | 11/2008 | Yano |

(Continued)

FOREIGN PATENT DOCUMENTS

| | | | |
|---|---|---|---|
| JP | 9-114134 | A | 5/1997 |
| JP | 9-179341 | A | 7/1997 |

(Continued)

OTHER PUBLICATIONS

Shibahara, Machine Translation of JP 2022-025866A, Feb. 10, 2022 (Year: 2022).*

(Continued)

*Primary Examiner* — Peter L Vajda
*Assistant Examiner* — Jenna Kuipers
(74) *Attorney, Agent, or Firm* — VENABLE LLP

(57) ABSTRACT

A toner comprising a toner particle comprising: a toner base particle comprising a binder resin; and an organosilicon polymer at a surface of the toner base particle, wherein protruded portions constituted from the organosilicon polymer are present at the surface of the toner base particle, when a protruded portion having a height of 30 to 200 nm among the protruded portions is defined as a protrusion x, and the protrusion x is observed in a specific condition using a scanning electron microscope, an average aspect ratio of the protrusion x is 1.3 or more, and when shape measurements of a specific region of the surface of the toner particle are carried out using an atomic force microscope and measured data obtained by observing the protruded portions at the surface of the toner particle is subjected to surface roughness analysis, an average angle of inclination Δa is 1.0 to 2.0°.

7 Claims, 1 Drawing Sheet

(56) References Cited

U.S. PATENT DOCUMENTS

| | | | |
|---|---|---|---|
| 7,510,813 | B2 | 3/2009 | Yano |
| 7,638,194 | B2 | 12/2009 | Fukui |
| 7,638,590 | B2 | 12/2009 | Fukui |
| 7,682,765 | B2 | 3/2010 | Sugawa |
| 7,795,363 | B2 | 9/2010 | Fukui |
| 7,811,735 | B2 | 10/2010 | Nakamura et al. |
| 7,935,771 | B2 | 5/2011 | Fukui |
| 8,067,136 | B2 | 11/2011 | Yano |
| 8,110,329 | B2 | 2/2012 | Tominaga |
| 8,178,271 | B2 | 5/2012 | Fukui |
| 8,288,069 | B2 | 10/2012 | Fujikawa |
| 8,323,726 | B2 | 12/2012 | Naka |
| 8,367,289 | B2 | 2/2013 | Isono |
| 8,383,312 | B2 | 2/2013 | Fujimoto |
| 8,440,382 | B2 | 5/2013 | Isono |
| 8,497,054 | B2 | 7/2013 | Sugiyama |
| 8,574,801 | B2 | 11/2013 | Itabashi |
| 8,609,312 | B2 | 12/2013 | Itabashi |
| 8,652,737 | B2 | 2/2014 | Handa |
| 8,778,581 | B2 | 7/2014 | Nonaka |
| 8,828,633 | B2 | 9/2014 | Itabashi |
| 8,918,035 | B2 | 12/2014 | Hasegawa |
| 8,986,914 | B2 | 3/2015 | Fujikawa |
| 9,029,056 | B2 | 5/2015 | Kenmoku |
| 9,034,549 | B2 | 5/2015 | Shiotari |
| 9,098,002 | B2 | 8/2015 | Kenmoku |
| 9,098,003 | B2 | 8/2015 | Masumoto |
| 9,158,216 | B2 | 10/2015 | Shimano |
| 9,244,371 | B2 | 1/2016 | Suzumura |
| 9,256,148 | B2 | 2/2016 | Fujikawa |
| 9,261,806 | B2 | 2/2016 | Moribe |
| 9,285,697 | B2 | 3/2016 | Fukudome |
| 9,304,422 | B2 | 4/2016 | Matsui |
| 9,348,246 | B2 | 5/2016 | Magome |
| 9,354,545 | B2 | 5/2016 | Matsui |
| 9,377,705 | B2 | 6/2016 | Shimano |
| 9,377,708 | B2 | 6/2016 | Magome |
| 9,383,668 | B2 | 7/2016 | Noji |
| 9,423,711 | B2 | 8/2016 | Uratani |
| 9,423,714 | B2 | 8/2016 | Kenmoku |
| 9,442,416 | B2 | 9/2016 | Magome |
| 9,500,972 | B2 | 11/2016 | Tanaka |
| 9,575,424 | B2 | 2/2017 | Nakagawa |
| 9,594,323 | B2 | 3/2017 | Fujikawa |
| 9,599,919 | B2 | 3/2017 | Isono |
| 9,625,842 | B2 | 4/2017 | Uratani |
| 9,658,546 | B2 | 5/2017 | Tanaka |
| 9,658,549 | B2 | 5/2017 | Tanaka |
| 9,785,071 | B2 | 10/2017 | Shimano |
| 9,804,514 | B2 | 10/2017 | Suzumura |
| 9,829,816 | B2 | 11/2017 | Tanaka |
| 9,835,964 | B2 | 12/2017 | Yoshida |
| 9,841,692 | B2 | 12/2017 | Hasegawa |
| 9,857,707 | B2 | 1/2018 | Tsuda |
| 9,880,478 | B2 | 1/2018 | Shimano |
| 9,904,193 | B2 | 2/2018 | Nakagawa |
| 9,958,801 | B2 | 5/2018 | Tanaka |
| 9,964,874 | B2 | 5/2018 | Suzumura |
| 10,054,866 | B2 | 8/2018 | Tanaka |
| 10,078,279 | B2 | 9/2018 | Nakagawa |
| 10,101,681 | B2 | 10/2018 | Tagawa |
| 10,114,303 | B2 | 10/2018 | Katsura |
| 10,216,107 | B2 | 2/2019 | Tsubaki |
| 10,228,627 | B2 | 3/2019 | Nagashima |
| 10,310,397 | B2 | 6/2019 | Sano |
| 10,545,420 | B2 | 1/2020 | Kinumatsu |
| 10,578,990 | B2 | 3/2020 | Tsuda |
| 10,678,155 | B2 | 6/2020 | Terui |
| 10,698,327 | B2 | 6/2020 | Nagashima |
| 10,747,133 | B2 | 8/2020 | Yagi |
| 10,747,136 | B2 | 8/2020 | Kenmoku |
| 10,782,623 | B2 | 9/2020 | Yoshiba |
| 10,942,465 | B2 | 3/2021 | Kototani |
| 10,942,466 | B2 | 3/2021 | Tominaga |
| 10,948,839 | B2 | 3/2021 | Tsubaki |
| 10,976,678 | B2 | 4/2021 | Yamawaki |
| 10,976,679 | B2 | 4/2021 | Tanaka |
| 11,003,104 | B2 | 5/2021 | Katsura |
| 11,003,105 | B2 | 5/2021 | Sato |
| 11,086,242 | B2 | 8/2021 | Isono |
| 11,112,708 | B2 | 9/2021 | Uratani |
| 11,169,458 | B2 | 11/2021 | Toyoizumi |
| 11,169,460 | B2 | 11/2021 | Kototani |
| 11,175,600 | B2 | 11/2021 | Uchiyama |
| 11,181,845 | B2 | 11/2021 | Shimoda |
| 11,249,412 | B2 | 2/2022 | Kawamura |
| 11,256,187 | B2 | 2/2022 | Ogaki |
| 11,314,178 | B2 | 4/2022 | Kenmoku |
| 11,347,157 | B2 | 5/2022 | Kamikura |
| 11,397,386 | B2 | 7/2022 | Kyuushima |
| 11,531,282 | B2 | 12/2022 | Kamikura |
| 11,714,363 | B2 | 8/2023 | Ookubo |
| 2012/0328979 | A1 | 12/2012 | Yoshizaki |
| 2013/0011774 | A1 | 1/2013 | Kamiwaki et al. |
| 2015/0099222 | A1 | 4/2015 | Terui |
| 2020/0026208 | A1* | 1/2020 | Terui .................. G03G 9/08755 |
| 2020/0124998 | A1 | 4/2020 | Kototani |
| 2020/0209771 | A1 | 7/2020 | Hashimoto et al. |
| 2020/0292955 | A1 | 9/2020 | Matsunaga et al. |
| 2020/0341400 | A1 | 10/2020 | Shimoda et al. |
| 2021/0026265 | A1 | 1/2021 | Kamikura et al. |
| 2021/0223731 | A1 | 7/2021 | Suzuki et al. |
| 2021/0311405 | A1 | 10/2021 | Shiotari |
| 2021/0318630 | A1 | 10/2021 | Terui |
| 2021/0318631 | A1 | 10/2021 | Isono |
| 2022/0075284 | A1 | 3/2022 | Nakayama |
| 2022/0128915 | A1 | 4/2022 | Toyoda |
| 2022/0128916 | A1 | 4/2022 | Yoshida |
| 2022/0128918 | A1* | 4/2022 | Kototani ............ G03G 9/09775 |
| 2022/0128919 | A1 | 4/2022 | Kawamura |
| 2022/0146952 | A1 | 5/2022 | Komiya |
| 2022/0146953 | A1 | 5/2022 | Kyuushima |
| 2022/0146954 | A1 | 5/2022 | Kato |
| 2022/0146955 | A1 | 5/2022 | Nozaki |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0390870 | A1 | 12/2022 | Kyuushima |
| 2022/0390871 | A1 | 12/2022 | Isono |
| 2022/0397836 | A1 | 12/2022 | Toyoda |
| 2022/0404730 | A1 | 12/2022 | Nagaoka |
| 2022/0413407 | A1 | 12/2022 | Inoue |
| 2023/0080900 | A1 | 3/2023 | Kamikura |
| 2023/0114583 | A1 | 4/2023 | Kenmoku |
| 2023/0116451 | A1 | 4/2023 | Uratani |
| 2023/0117448 | A1 | 4/2023 | Fukudome |
| 2023/0119795 | A1 | 4/2023 | Saeki |
| 2023/0161277 | A1 | 5/2023 | Komiya |

FOREIGN PATENT DOCUMENTS

| | | | |
|---|---|---|---|
| JP | 2008-9211 | A | 1/2008 |
| JP | 2011-227498 | A | 11/2011 |
| JP | 2015-96948 | A | 5/2015 |
| JP | 2019-86641 | A | 6/2019 |
| JP | 2020-12943 | A | 1/2020 |
| JP | 2020-64254 | A | 4/2020 |
| JP | 2020-154292 | A | 9/2020 |
| JP | 2020-181187 | A | 11/2020 |
| JP | 2021-18335 | A | 2/2021 |
| JP | 2021-113861 | A | 8/2021 |
| JP | 2021-167896 | A | 10/2021 |
| JP | 2022025866 | A * | 2/2022 |
| JP | 2022-69321 | A | 5/2022 |
| JP | 2022-92582 | A | 6/2022 |

OTHER PUBLICATIONS

U.S. Appl. No. 18/321,312, Keisuke Adachi, filed May 22, 2023.
U.S. Appl. No. 18/327,506, Masaya Komuro, filed Jun. 1, 2023.
U.S. Appl. No. 18/350,248, Yoshiaki Shiotari, filed Jul. 11, 2023.
U.S. Appl. No. 18/350,260, Kenji Ookubo, filed Jul. 11, 2023.
U.S. Appl. No. 18/350,266, Mayumi Inoue, filed Jul. 11, 2023.

(56) References Cited

OTHER PUBLICATIONS

U.S. Appl. No. 18/350,331, Shohei Kototani, filed Jul. 11, 2023.
U.S. Appl. No. 18/354,776, Shohei Kototani, filed Jul. 19, 2023.
Robert F. Fedors, A Method for Estimating Both the Solubility Parameters and Molar Volumes of Liquids, Polymer Engineering and Science, vol. 14, No. 2, 147-154,1974.

* cited by examiner

TONER

BACKGROUND OF THE INVENTION

Field of the Invention

The present disclosure relates to a toner used in order to form a toner image through development of an electrostatic latent image formed using a method such as an electrophotography method, an electrostatic recording method or a toner jet method.

Description of the Related Art

Over the years, there have been increasing demands from users for developments in electrophotography techniques and apparatuses used in reception equipment such as copiers, printers and fax machines. Because market expansion has broadened the environment in which these features are used in recent years, there are growing demands for compact designs from the perspective of saving space. From the perspective of compactness, using cleaner-less systems and reducing the amount of waste toner are effective means, and toner transferability is improving.

Reducing attachment forces of toners to electrostatic image bearing members is an effective way to improve transferability. A means of improving transfer efficiency by lowering physical attachment forces between a toner and an electrostatic image bearing member by a spacer effect achieved by adding a large particle diameter external additive to a toner particle surface has been proposed as a means for reducing attachment forces of toners.

However, this means is effective in terms of improving transfer efficiency, but long-term image outputting causes migration, detachment and embedding of spherical external additives having large particle diameters, and because the external additives become unable to function as spacers, there are challenges in terms of maintaining transferability over a long period of time. Therefore, it is essential to provide a control mechanism that detects the operating environment and the number of sheets of paper used and controls the current required for transfer. As a result, this leads to a drawback in terms of compactness because of the need to provide a variety of control devices.

In order to solve the problems mentioned above, a toner in which protruded portions are formed from an organosilicon polymer has been proposed, wherein high transferability is maintained by suppressing detachment/embedding of the protruded portions by controlling the shape of the protruded portions (Japanese Patent Application Publication No. 2020-012943). The measures mentioned above have made it possible to maintain high transferability, maintain transferability through simple controls, and achieve a more compact design.

SUMMARY OF THE INVENTION

However, the inventors of the present invention came to the conclusion that in the method disclosed in Japanese Patent Application Publication No. 2020-012943, a decrease in transferability caused by toner changes could not be suppressed, and that the variety of control devices could not be completely eliminated.

With a view to completely eliminating these control devices, there is a need for a toner which is less likely to undergo changes and can maintain transferability over a longer period of time.

The present disclosure provides a toner which is less likely to undergo changes and can maintain transferability even if used for a long period of time.

The present disclosure relates to a toner comprising a toner particle, the toner particle comprising:

- a toner base particle comprising a binder resin; and
- an organosilicon polymer at a surface of the toner base particle, wherein protruded portions constituted from the organosilicon polymer are present at the surface of the toner base particle,
- when a protruded portion having a height of 30 to 200 nm among the protruded portions is defined as a protrusion x, and the protrusion x is observed in a normal direction from the surface of the toner particle using a scanning electron microscope, an average aspect ratio of the protrusion x is 1.3 or more, and
- when shape measurements of a region measuring 1 μm×1 μm at the surface of the toner particle are carried out using an atomic force microscope and measured data obtained by observing the protruded portions at the surface of the toner particle is subjected to surface roughness analysis, an average angle of inclination Δa is 1.0 to 2.0°.

According to the present disclosure, it is possible to provide a toner which is less likely to undergo changes and can maintain transferability even if used for a long period of time. Further features of the present invention will become apparent from the following description of exemplary embodiments with reference to the attached drawings.

DESCRIPTION OF THE EMBODIMENTS

Figure 1:
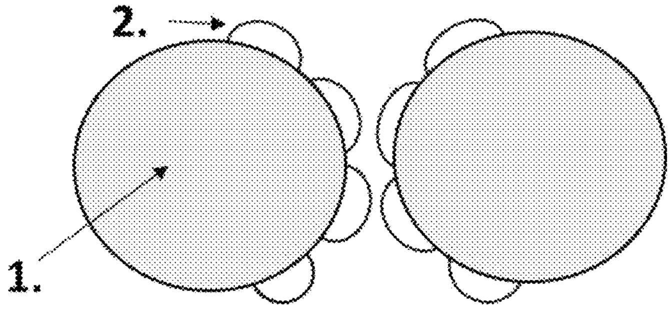
FIG. 1 is a schematic diagram of a toner having elliptical protrusions x.

In the present disclosure, the wordings "from XX to YY" and "XX to YY" expressing numerical value ranges mean numerical value ranges including the lower limit and the upper limit as endpoints, unless otherwise stated. When numerical value ranges are described stepwise, upper limits and lower limits of those numerical value ranges can be combined suitably.

The term "(meth)acrylic acid ester" means an acrylic acid ester and/or a methacrylic acid ester.

The term "monomer unit" refers to a reacted form of a monomer material included in a polymer. For example, a section including a carbon-carbon bond in a main chain of a polymer formed through polymerization of a vinyl monomer will be referred to as a single unit. A vinyl monomer can be represented by the following Formula (C).

(C)

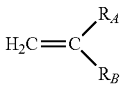

In the Formula (C), $R_A$ represents a hydrogen atom or an alkyl group (preferably, an alkyl group having 1 to 3 carbon atoms, and more preferably a methyl group), and $R_B$ represents any substituent.

The present disclosure relates to a toner comprising a toner particle, the toner particle comprising:

a toner base particle comprising a binder resin; and an organosilicon polymer at a surface of the toner base particle, wherein protruded portions constituted from the organosilicon polymer are present at the surface of the toner base particle, when a protruded portion having a height of 30 to 200 nm among the protruded portions is defined as a protrusion x, and the protrusion x is observed in a normal direction from the surface of the toner particle using a scanning electron microscope, an average aspect ratio of the protrusion x is 1.3 or more, and when shape measurements of a region measuring 1 μm×1 μm at the surface of the toner particle are carried out using an atomic force microscope and measured data obtained by observing the protruded portions at the surface of the toner particle is subjected to surface roughness analysis, an average angle of inclination Δa is 1.0 to 2.0°.

The requirements mentioned above will now be explained in detail.

The toner of the present disclosure comprises a toner particle comprising: a toner base particle comprising a binder resin; and an organosilicon polymer at a surface of the toner base particle. In addition, the organosilicon polymer forms protruded portions at the surface of the toner base particle. That is, protruded portions constituted from the organosilicon polymer are present at the surface of the toner base particle.

In addition, when a protruded portion having a height of 30 to 200 nm among the protruded portions is defined as a protrusion x, and the protrusion x is observed in a normal direction from the surface of the toner particle using a scanning electron microscope, it is an essential requirement that an average aspect ratio of the protrusion x is 1.3 or more, and when shape measurements of a region measuring 1 μm×1 μm at the surface of the toner particle are carried out using an atomic force microscope and measured data obtained by observing the protruded portions at the surface of the toner particle is subjected to surface roughness analysis (referred to simply as surface roughness analysis of measured data hereinafter), it is an essential requirement that an average angle of inclination Δa is 1.0 to 2.0°.

It was found that by satisfying the conditions mentioned above, it was possible to obtain a toner which is less likely to undergo changes and can maintain transferability even if used for a long period of time.

Here, the height of a protruded portion means the height from the surface of a toner base particle to the apex of the protruded portion.

A detailed mechanism is unclear, but is thought by the inventors of the present invention to be as follows.

Protrusions x having an average aspect ratio of 1.3 or more are formed as broadly elliptical shapes. As shown in FIG. 1, a broadly elliptical protrusion x, which is a protruded portion 2 constituted from an organosilicon polymer at the surface of a toner base particle 1, is unlikely to penetrate into spaces between toners, and is therefore unlikely to be susceptible to shearing caused by interlocking of protruded portions, and toner changes, such as detachment of protruded portions, are unlikely to occur even if the toner is used for a long period of time. That is, transferability can be maintained even if the toner is used for a long period of time.

Figure 2:
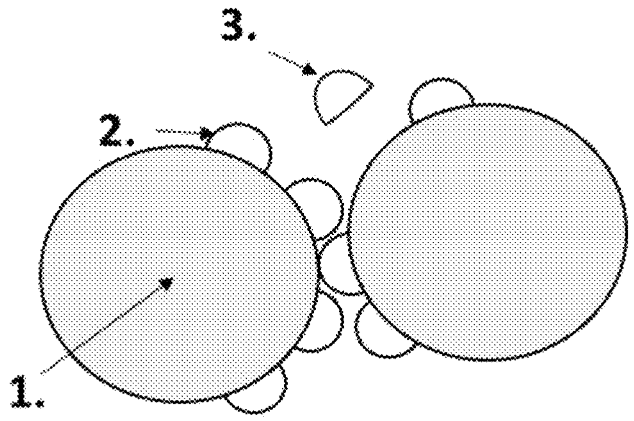
FIG. 2 is a schematic diagram of a toner having circular protrusions x.

The average aspect ratio is more preferably 1.5 or more, further preferably 2.0 or more, particularly preferably 2.5 or more, and especially preferably 3.0 or more. If the average aspect ratio is less than 1.3, protruded portions undergo interlocking between toners, as shown in FIG. 2, and are subject to shearing, and toner changes occur, such as a protruded portion being separated from a toner base particle and becoming a detached protruded portion 3. The upper limit of the average aspect ratio is not particularly limited, but is preferably 5.5 or less, and more preferably 4.0 or less.

For example, the average aspect ratio is preferably 1.3 to 5.5, 1.5 to 5.0, 2.5 to 4.5 or 3.0 to 4.0.

The average aspect ratio can be adjusted by adjusting condensation conditions (temperature, pH, and so on) of the organosilicon polymer that forms the protruded portions.

When the shape measurements of a region measuring 1 μm×1 μm at the surface of the toner particle are carried out using an atomic force microscope and measured data obtained by observing protruded portions at the surface of the toner particle is subjected to surface roughness analysis, an average angle of inclination Δa is 1.0 to 2.0°. Because the foot of a protruded portion is widened by forming the protruded portion so that the average angle of inclination Δa is 1.0 to 2.0°, shearing is dispersed from the normal direction, and toner changes caused by embedding of protruded portions is unlikely to occur.

The average angle of inclination Δa is preferably 1.2 to 1.9, and more preferably 1.3 to 1.7.

The average angle of inclination Δa can be adjusted by adjusting the wettability between the toner base particle and the organosilicon polymer that forms the protruded portions. It is thought that by adjusting the wettability, it is possible to adjust the shape when the organosilicon polymer forms a protruded portion at the surface of the toner base particle. Wettability can be adjusted by altering the composition of the organosilicon polymer or altering the composition at the surface of the toner base particle. For example, wettability can be adjusted by adjusting the type and quantity of organosilicon compound segments present on the toner base particle. Specifically, wettability can be adjusted by treating the surface of the toner base particle using a component having a high affinity for the organosilicon polymer, as described later, or by adjusting the type and quantity of this component having high affinity.

By satisfying all of these stipulations, it is possible to obtain a toner which hardly undergoes changes and in which detachment and embedding of protruded portions are suppressed and also possible to maintain transferability, even if the toner is used for a long period of time.

When the maximum peak height of protruded portions is defined as Sp (nm) in surface roughness analysis of measured data, a density Spd of protruded portions having peak heights of at least ¾ of the value of Sp is preferably 17 to 93 protruded portions/$\mu m^2$, more preferably 18 to 85 protruded portions/$\mu m^2$, further preferably 20 to 80 protruded portions/$\mu m^2$, and particularly preferably 25 to 65 protruded portions/$\mu m^2$.

The density Spd of protruded portions indicates the number per unit area of toner particle surface of protruded portions having peak heights of at least ¾ of the value of Sp in surface roughness analysis of measured data. If the density Spd of protruded portions falls within this range, the area of contact with a transfer member such as an electrostatic image bearing member decreases, physical attachment forces decrease, transfer efficiency increases, and the amount of untransferred toner is low. As a result, it is possible to maintain transferability over a long period of time and maintain suppression of fogging.

The density Spd of protruded portions can be adjusted by adjusting the added quantity of the organosilicon polymer, and so on.

Means for forming protruded portions by incorporating the organosilicon polymer at the surface of the toner base particle and forming protruded portions from the organosilicon polymer at the surface of the toner base particle are not particularly limited, but a production method known as a sol-gel method is preferred.

The organosilicon polymer that forms protruded portions is preferably a condensation polymerization product of an organosilicon compound having a structure represented by Formula (Y) below. In addition, a condensation polymerization product of a hydrolyzate of an organosilicon compound having a structure represented by Formula (Y) below is more preferred.

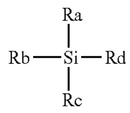

(Y)

[In Formula (Y), Ra denotes a hydrocarbon group (and preferably an alkyl group) having 1 to 6 carbon atoms, and Rb, Rc and Rd each independently denote a halogen atom, a hydroxyl group, an acetoxy group or an alkoxy group. Ra is preferably an aliphatic hydrocarbon group having 1 to 3 carbon atoms, and is more preferably a methyl group.]

Rb, Rc and Rd are each independently a halogen atom, a hydroxyl group, an acetoxy group or an alkoxy group (hereinafter referred to as reactive groups). These reactive groups undergo hydrolysis and/or condensation polymerization to form crosslinked structures.

In addition, hydrolysis of Rb, Rc and Rd and condensation polymerization can be controlled by adjusting the reaction temperature, the reaction time, the reaction solvent and the pH. In order to obtain the organosilicon polymer used in the present disclosure, it is possible to use an organosilicon compound having three reactive groups (Rb, Rc and Rd) in the molecule, excluding Ra in Formula (Y) above (hereinafter referred to as a "trifunctional silane"), or a combination of a plurality of these compounds.

Hydrolysis conditions are not particularly limited, but a pH of 2.0 to 6.0, a temperature of 30 to 70° C. and a time of 2 to 5 hours are preferred.

Examples of compounds represented by Formula (Y) above include those listed below.

Trifunctional methylsilane compounds such as methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane and methyldiethoxyhydroxysilane.

Trifunctional silane compounds such as ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane and hexyltrihydroxysilane.

Trifunctional phenylsilane compounds such as phenyltrimethoxysilane, phenyltriethoxysilane, phenyltrichlorosilane, phenyltriacetoxysilane and phenyltrihydroxysilane.

It is known that in sol-gel reactions of alkoxysilanes, the bonding form of generated siloxane bonds generally differs according to the acidity of an aqueous medium that is a reaction medium.

Specifically, in a case where an aqueous medium is acidic, a hydrogen ion ($H^+$) is electrophilically added to one reactive group (for example, oxygen in an alkoxy group; an —OR group). Next, an oxygen atom in a water molecule coordinates to a silicon atom, and a silanol group is formed by a substitution reaction. In a case where a sufficient amount of water is present, because one $H^+$ acts on one reactive group (for example, oxygen in an alkoxy group; an —OR group), if the content of $H^+$ in the aqueous medium is low, the electrophilic addition to the reactive medium is slow and the substitution reaction to a silanol group is slow. Therefore, in this case, all silane-bonded reactive groups undergo a condensation polymerization reaction prior to hydrolysis, and one-dimensional linear polymers or two-dimensional polymers tend to be produced relatively easily.

Meanwhile, in a case where a medium is alkaline, a hydroxide ion is added to silicon to produce a 5-coordinated intermediate. Therefore, all reactive groups (for example, alkoxy groups; —OR groups) are readily detached and are easily substituted by silanol groups. In particular, in a case where a silicon compound having 3 or more reactive groups is used in the same silane, hydrolysis and condensation polymerization occur three dimensionally and an organosilicon polymer having a large number of three-dimensional crosslinking bonds is formed. In addition, the reaction is completed in a short time.

Furthermore, because the sol-gel method starts with a solution and forms a material by gelling the solution, it is possible to produce a variety of fine structures and shapes. Therefore, by controlling reaction conditions of the condensation polymerization (addition time, temperature, pH, holding time, and so on), it is easy to control the protruded shape to a shape specified in the present disclosure.

Reaction conditions for the condensation polymerization reaction are not particularly limited as long as other requirements are satisfied, but it is preferable to carry out this reaction in two separate stages. By dividing into two stages, it becomes easier to control to a protruded shape specified in the present disclosure.

In the first stage condensation polymerization reaction, the added quantity of an organosilicon compound or organosilicon compound hydrolyzate is preferably 1.0 to 35.0 parts by mass, more preferably 5.0 to 33.0 parts by mass, further preferably 10.0 to 30.0 parts by mass, particularly preferably 15.0 to 29.0 parts by mass, and especially preferably 16.0 to 28.0 parts by mass, relative to 100 parts by mass of the toner base particle.

In addition, the organosilicon compound or organosilicon compound hydrolyzate is preferably added over a period of 1 to 30 minutes, and more preferably over a period of 1 to 20 minutes.

Furthermore, the pH of an aqueous medium is preferably 5.0 to 9.0, more preferably 5.5 to 8.5, and further preferably 7.5 to 8.5.

In addition, the holding time is preferably 5 to 40 minutes, and more preferably 10 to 30 minutes.

In the second stage condensation polymerization reaction, the pH of the aqueous medium is preferably 9.0 to 12.0, more preferably 9.5 to 11.5, and further preferably 10.0 to 11.0. In addition, the holding time is preferably 1.0 to 3.5 hours, and more preferably 2.0 to 3.0 hours.

By configuring in this way, the shape of protruded portions formed at the surface of the toner base particle by the organosilicon polymer can be easily controlled to a shape specified in the present disclosure.

The toner base particle preferably has an organosilicon compound segment, and more preferably contains a condensation product of an organosilicon compound. The organosilicon compound segment is, for example, a monomer unit having organic silicon introduced in a binder resin (or a condensation product of an organosilicon compound). The organosilicon compound segment preferably contains at least one selected from the group consisting of organosilicon compounds and condensation products of organosilicon compounds.

In order for the toner base particle to have an organosilicon compound segment, it is preferable to, for example, treat the surface of the toner base particle using a component having high affinity for the organosilicon polymer. That is, it is preferable for the toner particle to be a surface-treated product of the toner base particle. In order to treat the surface of the toner base particle, it is preferable to use, for example, a trifunctional silane compound having an acryloxyalkyl group or methacryloxyalkyl group as a substituent group, a difunctional silane compound having an acryloxyalkyl group or methacryloxyalkyl group, or the like. In this way, the surface of the toner base particle is modified and wettability between the organosilicon polymer and the toner base particle can be adjusted. As a result, the shape of the organosilicon compound can be more easily controlled. Hereinafter, a toner base particle whose surface has been treated is encompassed by the toner base particle.

In addition, as a result of the surface of the toner base particle being treated, the toner particle may have an intermediate layer at the surface of the toner base particle.

Examples of trifunctional silane compounds include those listed below.

Trifunctional silane compounds having a methacryloxyalkyl group as a substituent group, such as 3-methacryloxypropyltrimethoxysilane, 3-methacryloxypropyltriethoxysilane, 3-methacryloxyoctyltrimethoxysilane, 3-methacryloxypropyldiethoxymethoxysilane, 3-methacryloxypropylethoxydimethoxysilane and 3-methacryloxypropyl-tris(trimethylsiloxy)silane;

Trifunctional silane compounds having an acryloxyalkyl group as a substituent group, such as 3-acryloxypropyltrimethoxysilane, 3-acryloxypropyltriethoxysilane, 3-acryloxyoctyltrimethoxysilane, 3-acryloxypropyldiethoxymethoxysilane, 3-acryloxypropylethoxydimethoxysilane.

Examples of difunctional silane compounds include those listed below.

Difunctional silane compounds having a methacryloxyalkyl group as a substituent group, such as 3-methacryloxypropylmethyldimethoxysilane, 3-methacryloxypropyldiethoxymethylsilane, 3-methacryloxypropylethyldimethoxysilane, 3-methacryloxypropylethyldiethoxysilane and 3-methacryloxypropylethoxymethylmethoxysilane;

Difunctional silane compounds having an acryloxyalkyl group as a substituent group, such as 3-acryloxypropylmethyldimethoxysilane, 3-acryloxypropyldiethoxymethylsilane, 3-acryloxypropylethyldimethoxysilane, 3-acryloxypropylethyldiethoxysilane and 3-acryloxypropylethoxymethylmethoxysilane.

The toner base particle has an organosilicon compound segment, and the normalized intensity of silicon ions (m/z=28), which is obtained by measuring the toner base particle using time of flight secondary ion mass spectrometry (also referred to as TOF-SIMS hereinafter), is preferably 0.0007 to 0.0882, more preferably 0.0008 to 0.0800, and further preferably 0.0010 to 0.0700.

If the toner base particle has an organosilicon compound segment and has the normalized intensity mentioned above, this shows that the surface of the toner base particle has been treated to a suitable degree by a component having a high affinity for the organosilicon polymer. If the normalized intensity falls within the range mentioned above, the shape of the organosilicon compound can be more easily controlled and transferability can therefore be maintained even if the toner is used for a long period of time. In addition, low-temperature fixability can be improved.

The normalized intensity can be adjusted by adjusting the number of parts of a silane compound used for treating the surface of the toner base particle or by adjusting the type and quantity of the organosilicon compound segment present at the surface of the toner base particle.

An example of a method for achieving the normalized intensity mentioned above is a method comprising adding a Si-containing monomer such as a silane coupling agent during the toner base particle polymerization step (for example, in the latter half of the polymerization step) so as to incorporate silicon in the toner base particle. Another example is a method comprising polymerizing a silane coupling agent in an aqueous medium in which toner base particles are dispersed so as to incorporate silicon in the toner base particle.

The organosilicon compound segment contained in the toner base particle may be contained as a part of a resin such as a binder resin contained in a base particle. For example, a binder resin may contain a structure represented by Formula (3) below. By polymerizing a trifunctional silane coupling agent having a methacryloxyalkyl group, or the like, together with a monomer of a styrene acrylic resin, it is possible to obtain a structure represented by Formula (3). For example, it is preferable to form a toner base particle having a styrene acrylic resin as a binder resin by means of suspension polymerization or the like, then add a trifunctional silane coupling agent having a methacryloxyalkyl group and carry out polymerization.

It is thought that the structure represented by Formula (3) has high affinity due to containing the same —$SiO_{3/2}$ structure as the organosilicon polymer contained as a primary component of a protruded portion.

(3)

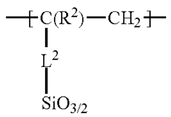

(In Formula (3), $L^2$ denotes —$COO(CH_2)_n$— (n denotes an integer of 1 to 10 (and preferably 2 to 8), and a carbonyl group in $L^2$ bonds to a carbon atom in the main chain (a carbon atom having $R^2$. $R^2$ denotes a hydrogen atom or a methyl group.)

When a total area of the surface of the toner particle is defined as S and an area of those regions of the surface of the toner particle where the surface of the toner base particle is coated with the organosilicon polymer is defined as Sc, a value of a ratio of Sc relative to S (Sc/S) is preferably 0.32 to 0.79, more preferably 0.35 to 0.72, further preferably 0.40 to 0.70, particularly preferably 0.45 to 0.65, and especially preferably 0.50 to 0.60. The value of Sc/S indicates the coverage ratio of the toner particle surface by the organosilicon polymer.

If the value of Sc/S falls within the range mentioned above, charging performance is excellent, fogging is unlikely to occur, fixing impairment due to the organosilicon polymer is unlikely to occur, and fixing performance is excellent.

The value of Sc/S can be adjusted by adjusting the holding time, the added number of parts of an organosilicon compound or organosilicon compound hydrolyzate used in the condensation polymerization reaction, and so on.

Specific toner production methods will now be explained, but the present disclosure is not limited to these.

Is preferable to produce a toner base particle in an aqueous medium and form protruded portions containing an organosilicon polymer at the surface of the toner base particle using the method described above.

As a method for producing the toner base particle, a suspension polymerization method, a dissolution suspension method or an emulsion aggregation method is preferred, and of these, a suspension polymerization is more preferred. In a suspension polymerization method, the organosilicon polymer tends to be uniformly precipitated at the surface of the toner base particle, adhesive properties of the organosilicon polymer are excellent, and environmental stability, suppression of charge inversion components and long-term sustainment of these effects are good. A suspension polymerization method will now be explained in greater detail.

A suspension polymerization method is a method in which toner base particles are obtained by granulating a polymerizable monomer composition containing a polymerizable monomer able to form a binder resin and, if necessary, additives such as a colorant in an aqueous medium, and then polymerizing the polymerizable monomer contained in the polymerizable monomer composition. That is, the toner base particle contains a binder resin.

The proportion of the binder resin in the toner base particle is not particularly limited, but is, for example, 50.0 to 95.0 mass %, 60.0 to 90.0 mass % or 70.0 to 80.0 mass %.

If necessary, a release agent and other resins may be added to the polymerizable monomer composition. In addition, following completion of the polymerization step, produced particles can be washed and recovered by filtration using well-known methods. Moreover, the temperature may be increased in the latter half of the polymerization step. Furthermore, in order to remove by-products and unreacted polymerizable monomer, it is possible to distill off some of a dispersion medium from the reaction system in the latter half of the polymerization step or following completion of the polymerization step.

It is preferable to form protruded portions of the organosilicon polymer by means of the method described above using the thus obtained toner base particles.

The toner particle may contain a release agent. Examples of release agents include those listed below.

Petroleum-based waxes and derivatives thereof, such as paraffin waxes, microcrystalline waxes and petrolatum, montan wax and derivatives thereof, hydrocarbon waxes and derivatives thereof obtained using the Fischer Tropsch process, polyolefin waxes and derivatives thereof, such as polyethylene waxes and polypropylene waxes, natural waxes and derivatives thereof, such as carnauba wax and candelilla wax, higher aliphatic alcohols, fatty acids such as stearic acid and palmitic acid and acid amides, esters and ketones thereof, hydrogenated castor oil and derivatives thereof, plant-based waxes, animal-based waxes and silicone resins.

Moreover, derivatives include oxides, block copolymers formed with vinyl monomers, and graft-modified products. It is possible to use a single release agent in isolation or a mixture comprising multiple release agents.

The content of the release agent is preferably 2.0 to 30.0 parts by mass relative to 100 parts by mass of the binder resin or a polymerizable monomer that produces the binder resin.

Vinyl-based polymerizable monomers shown below can be advantageously used as the polymerizable monomer.

Styrene; styrene derivatives such as α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; acrylic polymerizable monomers such as methyl acrylate, ethyl acrylate, n-propyl acrylate, iso-propyl acrylate, n-butyl acrylate, iso-butyl acrylate, tert-butyl acrylate, n-amyl acrylate, n-hexyl acrylate, 2-ethylhexyl acrylate, n-octyl acrylate, n-nonyl acrylate, cyclohexyl acrylate, benzyl acrylate, dimethyl phosphate ethyl acrylate, diethyl phosphate ethyl acrylate, dibutyl phosphate ethyl acrylate and 2-benzoyloxyethyl acrylate; methacrylic polymerizable monomers such as methyl methacrylate, ethyl methacrylate, n-propyl methacrylate, iso-propyl methacrylate, n-butyl methacrylate, iso-butyl methacrylate, tert-butyl methacrylate, n-amyl methacrylate, n-hexyl methacrylate, 2-ethylhexyl methacrylate, n-octyl methacrylate, n-nonyl methacrylate, diethyl phosphate ethyl methacrylate and dibutyl phosphate ethyl methacrylate; methylene aliphatic monocarboxylic acid esters; vinyl esters such as vinyl acetate, vinyl propionate, vinyl benzoate, vinyl butyrate, vinyl benzoate and vinyl formate; vinyl ethers such as vinyl methyl ether, vinyl ethyl ether and vinyl isobutyl ether; vinyl methyl ketone, vinyl hexyl ketone and vinyl isopropyl ketone.

Of these vinyl polymers, styrene, styrene derivatives, acrylic polymerizable monomers and methacrylic polymerizable monomers are preferred. That is, the binder resin preferably contains a styrene acrylic resin, and more preferably contains a styrene acrylic resin as a primary component.

Here, the expression "contained as a primary component" means that the content ratio of the styrene acrylic resin in the binder resin is, for example, 50.0 to 100.0 mass %, 65.0 to 100.0 mass %, or 80.0 to 100.0 mass %.

The binder resin preferably contains a monomer unit represented by Formula (1) below. The content ratio of the monomer unit represented by Formula (1) in the binder resin is preferably 3.0 to 30.0 mass %, more preferably 5.0 to 20.0 mass %, and further preferably 6.0 to 15.0 mass %. In cases where the content ratio of the monomer unit represented by Formula (1) falls within the range mentioned above, excellent fixing performance can be achieved.

(1)

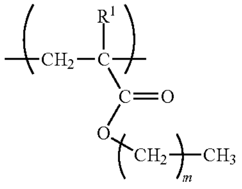

(In Formula (1), $R^1$ denotes a hydrogen atom or a methyl group, and m denotes an integer of 3 to 30 (preferably 6 to 25, more preferably 10 to 22, and further preferably 10 to 12). $R^1$ is preferably a hydrogen atom.)

An example of a method for introducing the monomer unit represented by Formula (1) is a method comprising subjecting (meth)acrylic acid esters such as those listed below to vinyl polymerization.

For example, monomers such as (meth)acrylic acid esters having a linear alkyl group with 4 to 31 carbon atoms [butyl (meth)acrylate, pentyl (meth)acrylate, hexyl (meth)acrylate, heptyl (meth)acrylate, octyl (meth)acrylate, nonyl (meth) acrylate, decyl (meth)acrylate, lauryl (meth)acrylate, myristyl (meth)acrylate, palmityl (meth)acrylate, and the like], and (meth)acrylic acid esters having a branched alkyl group with 5 to 31 carbon atoms [ethylhexyl (meth)acrylate and the like].

The monomer unit represented by Formula (1) may be a single monomer unit or a combination of two or more types.

The binder resin may also have other monomer units in addition to the monomer unit represented by Formula (1) above. An example of a method for introducing another monomer unit is a method comprising polymerizing a monomer that forms the monomer unit represented by Formula (1) above and a polymerizable monomer listed above.

The binder resin preferably contains a monomer unit represented by Formula (2) below. The content ratio of the monomer unit represented by Formula (2) in the binder resin is preferably 50.0 to 97.0 mass %, more preferably 60.0 to 90.0 mass %, further preferably 71.0 to 81.0 mass %, and particularly preferably 74.0 to 78.0 mass %. If this content ratio falls within the range mentioned above, it is possible to obtain a toner having excellent fixing performance.

(2)

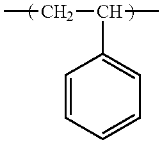

In addition, a polymerization initiator may be added when the polymerizable monomer is polymerized. Examples of the polymerization initiator include those listed below.

Azo-based and diazo-based polymerization initiators such as 2,2'-azobis-(2,4-dimethyldivaleronitrile), 2,2'-azobisisobutyronitrile, 1,1'-azobis(cyclohexane-1-carbonitrile), 2,2'-azobis-4-methoxy-2,4-dimethylvaleronitrile and azobisisobutyronitrile; and peroxide-based polymerization initiators such as benzoyl peroxide, methyl ethyl ketone peroxide, diisopropyl oxycarbonate, cumene hydroperoxide, 2,4-dichlorobenzoyl peroxide and lauroyl peroxide.

These polymerization initiators are preferably added at a quantity of 0.5 to 30.0 parts by mass relative to 100 parts by mass of polymerizable monomer, and it is possible to use a single polymerization initiator in isolation or a combination of multiple polymerization initiators.

In addition, a chain transfer agent may be added when the polymerizable monomer is polymerized in order to control the molecular weight of the binder resin that constitutes the toner base particle. The added quantity thereof is preferably 0.001 to 15.000 parts by mass relative to 100 parts by mass of polymerizable monomer.

Meanwhile, a crosslinking agent may be added when the polymerizable monomer is polymerized in order to control the molecular weight of the binder resin that constitutes the toner base particle. Examples thereof include those listed below.

Divinylbenzene, bis(4-acryloxypolyethoxyphenyl)propane, ethylene glycol diacrylate, 1,3-butylene glycol diacrylate, 1,4-butane diol diacrylate, 1,5-pentane diol diacrylate, 1,6-hexane diol diacrylate, neopentyl glycol diacrylate, diethylene glycol diacrylate, triethylene glycol diacrylate, tetraethylene glycol diacrylate, polyethylene glycol #200, #400, and #600, dipropylene glycol diacrylate, polypropylene glycol diacrylate, polyester type diacrylates (MANDA available from Nippon Kayaku Co., Ltd.) and compounds obtained by replacing the diacrylates mentioned above with dimethacrylates.

Examples of polyfunctional crosslinkable monomers include those listed below. Pentaerythritol triacrylate, trimethylolethane triacrylate, trimethylolpropane triacrylate, tetramethylolmethane triacrylate tetraacrylate, oligoester acrylates and methacrylates, 2,2-bis(4-methacryloxypolyethoxyphenyl)propane, diallyl phthalate, triallyl cyanurate, triallyl isocyanurate, triallyl trimellitate and diallyl chlorendate.

The added quantity thereof is preferably 0.001 to 15.000 parts by mass relative to 100 parts by mass of polymerizable monomer.

In cases where a medium used in the suspension polymerization described above is an aqueous medium, it is possible to use the compounds listed below as a dispersion stabilizer for particles of the polymerizable monomer composition.

Tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina.

In addition, examples of organic dispersing agents include those listed below. Poly(vinyl alcohol), gelatin, methyl cellulose, methylhydroxypropyl cellulose, ethyl cellulose, sodium carboxymethyl cellulose and starch.

In addition, commercially available non-ionic, anionic and cationic surfactants can be used. Examples of such surfactants include those listed below. Sodium dodecyl sulfate, sodium tetradecyl sulfate, sodium pentadecyl sulfate, sodium octyl sulfate, sodium oleate, sodium laurate and potassium stearate.

A colorant may be used in the toner, with the type thereof not being particularly limited, and well-known colorants can be used.

Moreover, the content of the colorant is preferably 3.0 to 15.0 parts by mass relative to 100 parts by mass of the binder resin or a polymerizable monomer that can produce the binder resin.

A charge control agent can be used when the toner is produced, and well-known charge control agents can be used. The added quantity of these charge control agents is preferably 0.01 to 10.00 parts by mass relative to 100 parts by mass of the binder resin or polymerizable monomer.

The toner particle may be used as-is as a toner, or a variety of organic or inorganic fine powders may be externally added to toner particles if necessary. The organic or inorganic fine powder preferably has a particle diameter that is not more than 1/10 of the weight average particle diameter of the toner particle from the perspective of durability when added to the toner particle.

Powders such as those listed below can be used as organic or inorganic fine powders.

(1) Flowability-imparting agents: silica, alumina, titanium oxide, carbon black and fluorocarbons.

(2) Abrasive materials: metal oxides (for example, strontium titanate, cerium oxide, alumina, magnesium oxide and chromium oxide), nitrides (for example, silicon nitride), carbides (for example, silicon carbide) and metal salts (for example, calcium sulfate, barium sulfate and calcium carbonate).

(3) Lubricants: fluororesin powders (for example, vinylidene fluoride and polytetrafluoroethylene) and fatty acid metal salts (for example, zinc stearate and calcium stearate).

(4) Charge control particles: metal oxides (for example, tin oxide, titanium oxide, zinc oxide, silica and alumina) and carbon black.

In order to improve the fluidity of the toner and make charging of the toner uniform, the organic or inorganic powders may be surface-treated. Examples of treatment agents for hydrophobically treating an organic or inorganic fine powder include unmodified silicone waxes, a variety of modified silicone waxes, unmodified silicone oils, a variety of modified silicone oils, silane compounds, silane coupling agents, other organosilicon compounds and organotitanium compounds. It is possible to use one of these treatment agents in isolation or a combination of multiple treatment agents.

Methods for measuring various physical properties relating to the present disclosure will now be explained.

Method for Measuring Weight Average Particle Diameter (D4) and Number Average Particle Diameter (D1) of Toner Particle (Toner Base Particle)

An apparatus for precisely measuring particle size distribution by means of a pore electrical resistance method is used ("Coulter Counter Multisizer 3" and accompanying software "Beckman Coulter Multisizer 3 Version 3.51" (produced by Beckman Coulter, Inc.)). Measurements are carried out using 25,000 effective measurement channels and an aperture diameter of 100 μm, and calculations are carried out by analyzing measured data.

A solution obtained by dissolving special grade sodium chloride in ion exchanged water at a concentration of 1 mass %, such as "ISOTON II" (produced by Beckman Coulter), can be used as an aqueous electrolyte solution used in the measurements.

Moreover, dedicated software was set up as follows before carrying out measurements and analysis.

On the "Standard Operating Method (SOM) alteration screen" in the dedicated software, the total count number in control mode is set to 50,000 particles, the number of measurements is set to 1, and the Kd value is set to "standard particle 10.0 μm" (Beckman Coulter). By pressing the threshold value/noise level measurement button, threshold values and noise levels are automatically set. In addition, the current is set to 1600 μA, the gain is set to 2, the electrolyte solution is set to ISOTON II (product name), and the "Flush aperture tube after measurement" option is checked.

On the "Screen for converting from pulse to particle diameter" in the dedicated software, the bin interval is set to logarithmic particle diameter, the particle diameter bin is set to 256 particle diameter bin, and the particle diameter range is set to from 2 μm to 60 μm.

The specific measurement method is as follows.

(1) 200 mL of the aqueous electrolyte solution is placed in a dedicated 250 mL Multisizer 3 glass round bottomed beaker, the beaker is set on a sample stand, and a stirring rod is rotated anticlockwise at a rate of 24 rotations/second. By carrying out the "Aperture flush" function of the analysis software, dirt and bubbles in the aperture tube are removed.

(2) 30 mL of the aqueous electrolyte solution is placed in a 100 mL glass flat bottomed beaker. To this is added 0.3 mL of a diluted liquid obtained by diluting Contaminon N™ (a 10 mass % aqueous solution of a neutral detergent for cleaning precision measurement equipment; produced by Wako Pure Chemical Industries, Ltd.) 3-fold in terms of mass with ion exchanged water.

(3) A prescribed quantity of ion exchanged water and 2 mL of Contaminon N (product name) are added to a water tank in an ultrasonic wave disperser (product name: Ultrasonic Dispersion System Tetora 150 produced by Nikkaki Bios Co., Ltd.) having an electrical output of 120 W, in which 2 oscillators having an oscillation frequency of 50 kHz are housed so that their phases are staggered by 180°.

(4) The beaker used in step (2) above is placed in a beaker-fixing hole in the ultrasonic wave disperser, and the ultrasonic wave disperser is activated. The height of the beaker is adjusted so that the resonant state of the liquid surface of the aqueous electrolyte solution in the beaker is at a maximum.

(5) While the aqueous electrolyte solution in the beaker mentioned in section (4) above is being irradiated with ultrasonic waves, 10 mg of toner (particles or base particles) are added a little at a time to the aqueous electrolyte solution and dispersed therein. The ultrasonic wave dispersion treatment is continued for a further 60 seconds. Moreover, when carrying out the ultrasonic wave dispersion, the temperature of the water bath is adjusted as appropriate to a temperature of 10° C. to 40° C.

(6) The aqueous electrolyte solution mentioned in section (5) above, in which the toner (particles) are dispersed, is added dropwise by means of a pipette to the round bottomed beaker mentioned in section (1) above, which is disposed on the sample stand, and the measurement concentration is adjusted to 5%. Measurements are carried out until the number of particles measured reaches 50,000.

(7) The weight average particle diameter (D4) is calculated by analyzing measurement data using the accompanying dedicated software. Moreover, when setting the graph/vol. % with the dedicated software, the "average diameter" on the analysis/volume-based statistical values (arithmetic mean) screen is weight average particle diameter (D4). When setting the graph/no.% with the dedicated software, the "average diameter" on the "Analysis/number-based statistical values (arithmetic mean)" screen is number average particle diameter (D1).

Method for Measuring Average Aspect Ratio of Protrusion x

The average aspect ratio of protrusion x is measured using a scanning electron microscope (SEM).

The SEM apparatus and observation conditions are as follows.

Apparatus used: Hitachi ultrahigh resolution field emission scanning electron microscope (5-4800 produced by Hitachi High-Technologies Corporation)

(1) Specimen Preparation

An electrically conductive paste (TED PELLA, Inc., Product No. 16053, PELCO Colloidal Graphite, Isopropanol base) is thinly coated on a specimen stand (an aluminum specimen stand measuring 15 mm×6 mm), and a toner is blown onto the paste. Platinum is then vapor deposited for 30 seconds at 15 mA. The specimen stand is placed on a specimen holder, and the specimen stand height is adjusted to a height of 36 mm using a specimen height gauge.

(2) Setting S-4800 Observation Conditions

Liquid nitrogen is poured into an anti-contamination trap fitted to the housing of the S-4800 until the liquid nitrogen overflows, and the anti-contamination trap is then allowed to stand for 30 minutes. The S-4800 "PC-SEM" is started, and flushing is carried out (an FE chip that is an electron source is cleaned). The accelerating voltage display section on the control panel of the screen is clicked, the "flushing" button is pressed, and the flushing dialogue is opened. Flushing is carried out after confirming that the flushing strength is 2. It is confirmed that the emission current from the flushing is 20 to 40 μA. The specimen holder is inserted into a specimen chamber in the S-4800 housing. "Start point" on the control panel is pushed, and the specimen holder is moved to the observation position.

The HV settings dialog is opened by clicking the accelerating voltage display section, and the accelerating voltage is set to "0.8 kV" and the emission current is set to "20 μA". Signal selection is set to "SE" in the "Basics" tab on the operation panel, "Upper (U)" and "+SE" are selected for the SE detector, and the apparatus is set to a mode in which a secondary electron image is observed. Similarly, the probe current is set to "Normal", the focusing mode is set to "UHR" and WD is set to "8.0 mm" in the electron optical system conditions block in the "Basics" tab on the operation panel. The "ON" button is pressed on the accelerating voltage display section of the control panel, and an accelerating voltage is applied.

(3) Focus Adjustment

The magnification ratio display section of the control panel is dragged to a magnification ratio of 5000 (5 k) times. Aperture alignment is adjusted by rotating the "Coarse" focusing button on the operation panel and focusing is more or less in focus. "Align" on the control panel is clicked, the alignment dialog is displayed, and "Beam" is selected. The STIGMA/ALIGNMENT buttons "X,Y" on the operation panel are rotated, and the displayed beam is moved to the center of concentric circles.

Next, "Aperture" is selected, the STIGMA/ALIGNMENT buttons "X,Y" are rotated once each so as to line up with each other so that image movement is stopped or minimum movement is attained. The Aperture dialog is closed, and focusing is achieved through autofocus. Focusing is achieved by repeating this procedure a further two times. Next, the magnification ratio display section of the control panel is dragged to a magnification ratio of 10,000 (10 k) times in a state whereby the middle point of the maximum diameter of the particle being observed lines up with the center of the measurement screen. Aperture alignment is adjusted by rotating the "Coarse" focusing button on the operation panel and focusing is more or less in focus. "Align" on the control panel is clicked, the alignment dialog is displayed, and "Beam" is selected. The STIGMA/ALIGNMENT buttons "X,Y" on the operation panel are rotated, and the displayed beam is moved to the center of concentric circles.

Next, "Aperture" is selected, the STIGMA/ALIGNMENT buttons "X,Y" are rotated once each so as to line up with each other so that image movement is stopped or minimum movement is attained. The Aperture dialog is closed, and focusing is achieved through autofocus. Next, the magnification ratio is set to 50,000 (50 k) times, focus adjustment is carried out using the focusing button and STIGMA/ALIGNMENT buttons in the same way as mentioned above, and focusing is again achieved through autofocus. Focusing is achieved by repeating this procedure.

(4) Image Storage

Brightness adjustment is carried out in ABC mode, and a photograph is taken at a size of 640×480 pixels and stored.

From the obtained SEM observation results, it can be confirmed that protruded portions formed from the organosilicon polymer are present at the surface of the toner base particle. Among protruded portions constituted from the organosilicon polymer, 50 protruded portions having heights of 30 to 200 nm are extracted randomly. The height of a protruded portion means the height from the surface of a toner base particle to the apex of the protruded portion.

In cases where the toner comprises the organosilicon polymer and silica fine particles, these can be identified and differentiated using the following method.

It is possible to use a combination of shape observations using SEM and elemental analysis using EDX for identifying organosilicon polymer fine particles and silica fine particles comprised in the toner.

The toner is observed in a field of view magnified a maximum of 50,000 times using a S-4800 scanning electron microscope (produced by Hitachi, Ltd.). The microscope is focused on the toner particle surface, and the protruded portion is observed. Protruded portions are subjected to EDX analysis, and whether or not an analyzed protruded portion is the organosilicon polymer is assessed by the presence/absence of Si element peaks.

In cases where the toner comprises both an organosilicon polymer and silica fine particles, the organosilicon polymer is identified by comparing the ratio (Si/O ratio) of Si and O element content values (atomic %). Standard samples of organosilicon polymer and silica fine particles are subjected to EDS analysis under the same conditions, and Si and O element content values (atomic %) are obtained. The Si/O ratio for the organosilicon polymer is defined as A, and the Si/O ratio for the silica fine particles is defined as B. Measurement conditions are selected so that the value of A is significantly higher than the value of B. Specifically, measurements are carried out 10 times under the same conditions for the standard samples, and arithmetic mean values for A and B are obtained. Measurement conditions are selected so that obtained average values are such that $A/B>1.1$.

In cases where the Si/O ratio of protruded portions to be differentiated is further towards A than $[(A+B)/2]$, it is assessed that the protruded portions in question are the organosilicon polymer.

Tospearl 120A (produced by Momentive Performance Materials Inc.) is used as the standard sample of the organosilicon polymer, and HDK V15 (produced by Asahi Kasei Corporation) is used as the standard sample of the silica fine particles.

The maximum diameter (long axis diameter L) of extracted protruded portions and the minimum diameter (short axis diameter s) that is perpendicular thereto are determined, the long axis diameter L/short axis diameter s ratio (aspect ratio) of the particles is calculated, and the arithmetic mean value of these ratios is taken to be the average aspect ratio.

Protruded portions having heights of 30 to 200 nm can be selected in the manner described below.

(i) For a toner to be subjected to the SEM observations described above, standard particles (monodispersed particles) having particle diameters of 30 to 200 nm are mixed with the toner in advance. The mixing can be carried out at 500 rpm using a high speed fluidizing mixer (SMP-2 produced by Kawata Co., Ltd.).

(ii) The toner with which the standard particles have been mixed is then observed using a SEM, and protruded portions able to be assessed as having a height that falls between the height of standard particles having a particle diameter of 30 nm and the height of standard particles having a particle diameter of 200 nm are identified.

In addition, the toner surface profile is measured using a roughness measuring device, and protruded portions can be analyzed on the basis of obtained data.

Method for Measuring Average Angle of Inclination Δa of Toner Particle and Density Spd of Protruded Portions The average angle of inclination Δa of toner particles and the density Spd of protruded portions are measured using an "AFM5500M" scanning probe microscope (SPM) produced by Hitachi High-Technologies Corporation. In addition, a SI-DF3P2 is used as a cantilever used for measurements. Furthermore, the measurement mode used is dynamic focus mode.

In addition, in cases where both the organosilicon polymer and silica fine particles are comprised in the toner, it is confirmed that a protruded portion is the organosilicon polymer using a SEM and the method described in the "Method for measuring average aspect ratio of protrusion x" section above. By using a common coordinate linkage holder for SEM-AFM at this point, protruded portions that have been identified as being the organosilicon polymer can be measured by the SPM.

Shape measurements are performed on a region measuring 1 μm×1 μm at the surface of the toner particle (also referred to as a measurement region hereinafter) using an AFM5500M, and protruded portions at the surface of the toner particle are observed. A toner particle having a particle diameter close to the average individual particle diameter (D1) of the toner base particle (for example, within ±1.0 μm of the average individual particle diameter of the toner base particle) is selected and subjected to measurements.

After carrying out inclination correction on 1 μm×1 μm measured data obtained using the shape measurements, the average angle of inclination and the average peak height Sp (nm) of protruded portions within the measurement region are calculated using surface roughness analysis.

In the inclination correction of measured data, corrections are made by carrying out curved surface corrections on the measured data in the following order: first-order curved surface correction, second-order curved surface correction and third-order curved surface correction. Corrections are made using AFM5000II, which is analysis software supplied with the AFM5500M. In the present disclosure, inclination correction is carried out by subjecting the measured data to analysis using the analysis software mentioned above in the following order: first-order inclination correction (first-order curved surface correction), second-order curved surface correction (second-order curved surface correction) and third-order inclination correction (third-order curved surface correction).

The average angle of inclination and the value of Sp can be calculated by referring to average angles of inclination and Sp values shown when surface roughness analysis of the inclination-corrected data is started in the "Analysis" tab of the analysis software mentioned above.

Furthermore, image data is excluded for portions having peak heights of less than ¾ of the Sp value, and the density of protruded portions (protruded portions/$\mu m^2$) is calculated by determining the number of protrusions per unit area.

The average angle of inclination and density of protruded portions (protruded portions/$\mu m^2$) are determined for 100 toner particles using the method described above, data is used for 80 particles, which are selected by excluding the 10 particles having the highest values and the 10 particles having the lowest values, and the arithmetic mean values for these 80 particles are taken to be the average angle of inclination Δa (°) of toner particles and the density Spd of protruded portions (protruded portions/$\mu m^2$).

Method for Measuring Value of Ratio of Sc Relative to S (Sc/S)

The value of the ratio of Sc relative to S (the coverage ratio of the surface of the toner particle by the organosilicon polymer) is calculated using a backscattered electron image of the surface of the toner particle.

A backscattered electron image of the surface of the toner particle is acquired using a scanning electron microscope (SEM).

The backscattered electron image obtained from the SEM is also known as a "compositional image", with atoms having lower atomic numbers being darker and atoms having higher atomic numbers being brighter.

Toner particles are generally resin particles containing mainly a composition comprising mainly carbon, such as resin components and a release agent. In cases where the organosilicon polymer is present at the surface of the toner particle, the organosilicon polymer is observed as a bright part and the toner particle surface is observed as a dark part in the backscattered electron image obtained from the SEM.

The SEM apparatus and observation conditions are as follows.

- Apparatus used: ULTRA PLUS produced by Carl Zeiss Microscopy
- Accelerating voltage: 1.0 kV
- WD: 2.0 mm
- Aperture Size: 30.0 μm
- Detection signal: EsB (energy-selected backscattered electron)
- EsB Grid: 800 V
- Magnification ratio: 50,000 times
- Contrast: 63.0±5.0% (reference value)
- Brightness: 38.0±5.0% (reference value)
- Resolution: 1024×768 pixels
- Pretreatment: toner particles are sprayed onto a carbon tape (vapor deposition is not carried out).

Contrast and brightness are set as appropriate according to the state of the apparatus being used. In addition, the accelerating voltage and EsB Grid are set so as to acquire structural data at the outermost surface of the toner particle, prevent charging up of undeposited specimen, and selectively detect backscattered electrons having high energy.

The observed field of view is selected near an apex, where the curvature of the toner particle is at a minimum.

Method for Confirming that Bright Parts in Backscattered Electron Image Correspond to Organosilicon Polymer It is confirmed that bright parts in an observed backscattered electron image correspond to the organosilicon polymer by overlaying the backscattered electron image on an electron mapping image acquired using energy dispersive X-Ray analysis (EDS), which can be acquired using a scanning electron microscope (SEM).

The SEM/EDS apparatus and observation conditions are as follows.

Apparatus used (SEM): ULTRA PLUS produced by Carl Zeiss Microscopy

Apparatus used (EDS): NORAN System 7 produced by Thermo Fisher Scientific, Ultra Dry EDS Detector Accelerating voltage: 5.0 kV WD: 7.0 mm Aperture Size: 30.0 μm Detection signal: SE2 (secondary electrons)

Magnification ratio: 50,000 times

Mode: Spectral Imaging

Pretreatment: toner particles are sprayed onto a carbon tape and sputtered with platinum.

The silicon element mapping image which is acquired in this technique is overlaid with the backscattered electron image, and it is confirmed that silicon atom parts in the mapping image match bright parts in the backscattered electron image. In this way, it is possible to confirm that the toner particle comprises the organosilicon polymer at the surface of the toner base particle.

In addition, in cases where both the organosilicon polymer and silica fine particles are comprised in the toner, it is confirmed that a protruded portion is the organosilicon polymer by using the method described in the "Method for measuring average aspect ratio of protrusion x" section above.

Method for Acquiring Brightness Histogram

A brightness histogram is acquired by analyzing the backscattered electron image of the outermost surface of the toner particle, which is acquired using the techniques described above, using image editing software (ImageJ developed by Wayne Rashand). The procedure is described below.

First, the backscattered electron image to be analyzed is converted to 8-bit from "Type" in the "Image" menu. Next, a median diameter of 2.0 pixels is set from "Filters" in the "Process" menu so as to reduce noise. The image center is estimated after excluding the observation conditions display section shown at the bottom of the backscattered electron image, and a region measuring 1.5 μm on each side is selected from the image center of the backscattered electron image using the "Rectangle Tool" in the toolbar.

Next, "Histogram" is selected from the "Analyze" menu, and a brightness histogram is displayed in a new window. Numerical values for the brightness histogram are acquired from "List" in this window. If necessary, fitting may be performed on the brightness histogram.

From here, a brightness that gives a local maximum value P1, a brightness that gives a local maximum value P2, the number of pixels thereof, a brightness that gives a local minimum value V and the number of pixels thereof are obtained.

The brightness that gives the local minimum value V is denoted as B1, the total number of pixels in the brightness range from 0 to B1 is denoted as A1, and the total number of pixels in the brightness range from (B1+1) to 255 is denoted as A2.

For example, the "brightness that gives a local maximum value P1" or "brightness that gives a local maximum value P2" means the brightness when the number of pixels takes the local maximum value P1 or the local maximum value P2.

This procedure is carried out for 10 fields of view on a toner particle to be evaluated, and the average value of each is taken to be a physical property value of a toner particle, as obtained from a brightness histogram.

Method for Analyzing Uncoated Portion Domain DO1 and Coated Portion Domain DO2

A region of the toner particle surface where the surface of the toner base particle is not coated with the organosilicon polymer is denoted as an uncoated portion domain DO1, and a region of the toner particle surface where the surface of the toner base particle is coated with the organosilicon polymer is denoted as a coated portion domain DO2. Uncoated portion domains DO1 and coated portion domains DO2 are analyzed by analyzing the backscattered electron image of the outermost surface of the toner particle, which is acquired using the techniques described above, using image editing software (ImageJ developed by Wayne Rashand). The procedure is described below.

First, the backscattered electron image to be analyzed is converted to 8-bit from "Type" in the "Image" menu. Next, a median diameter of 2.0 pixels is set from "Filters" in the "Process" menu so as to reduce noise. The image center is estimated after excluding the observation conditions display section shown at the bottom of the backscattered electron image, and a region measuring 1.5 μm on each side is selected from the image center of the backscattered electron image using the "Rectangle Tool" in the toolbar.

Next, "Threshold" is selected from "Adjust" in the "Image" menu. In this manual procedure, all pixels corresponding to brightness B1 are selected and a binarized image is acquired by clicking "Apply". By carrying out this procedure, pixels corresponding to A1 are shown as black (pixel group A1), and pixels corresponding to A2 are shown as white (pixel group A2). Once again, the image center is estimated after excluding the observation conditions display section shown at the bottom of the backscattered electron image, and a region measuring 1.5 μm on each side is selected from the image center of the backscattered electron image using the "Rectangle Tool" in the toolbar.

Next, using the "Straight Line" tool in the toolbar, the scale bar is selected in the observation conditions display section shown at the bottom of the backscattered electron image. In this state, if "Set Scale" is selected in the "Analyze" menu, a new window opens, and the straight line pixel distance selected in "Distance in Pixels" is inputted.

A scale bar value (for example, 100) is inputted in the "Known Distance" box in the aforementioned window, units for the scale bar (for example, nm) are inputted in the "Unit of Measurement" box, and scale settings are completed by clicking "OK".

"Set Measurements" is then selected in the "Analyze" menu, and "Area" and "Feret's diameter" are checked. "Analyze Particles" is selected in the "Analyze" menu, "Display Result" is checked, and domain analysis is carried out by clicking "OK".

From the newly opened "Results" window, the areas of domains corresponding to uncoated portion domains DO1 formed by pixel group A1 and coated portion domains DO2 formed by pixel group A2 are acquired.

The total area of obtained uncoated portion domains DO1 is defined as S1 ($\mu m^2$), and the total area of coated portion domains DO2 is defined as Sc ($\mu m^2$). Here, the total area of the surface of the toner particle S ($\mu m^2$) is shown by the sum of S1 and Sc. The value of the ratio of Sc relative to S is calculated from these values.

This procedure is carried out for 10 fields of view on a single toner particle to be evaluated, and the arithmetic mean value thereof is taken to be the value of the ratio of Sc relative to S.

Method for Measuring Standardized Intensity of Silicon Ions

The normalized intensity of silicon ions can be confirmed using time of flight secondary ion mass spectrometry (TOF-SIMS). Equipment used and measurement conditions are as shown below.

Moreover, measurements are carried out either on a toner base particle or on a toner particle from which external additives such as silica have been removed using a method described below.

Measurement apparatus: nanoTOF II (product name, produced by Ulvac-Phi)
Primary ion type: $Bi_3^{++}$
Accelerating voltage: 30 kV
Primary ion current: 0.05 pA
Repetition frequency: 8.2 kHz
Raster mode: Unbunch
Raster size: 100 μm×100 μm
Measurement mode: Positive
Neutralizing electron gun: used
Measurement time: 600 seconds
Specimen preparation: toner base particle or toner particle is fixed on indium sheet
Specimen pretreatment: none Using Ulvac-Phi standard software (TOF-DR), evaluations are carried out on the basis of mass numbers of Si ions derived from the toner base particle and fragmented ions. The normalized intensity of silicon ions (m/z=28) can be derived by dividing the intensity of ions derived from silicon, which has a mass number of 28 (m/z=28), by the intensity of all ions for which m/z=0.5 to 1850.

It can be confirmed that the normalized intensity of silicon ions (m/z=28) corresponds to an organosilicon compound segment such as a condensation product of an organosilicon compound by carrying out solid $^{29}$Si-NMR measurements, which are described later.

In cases where the toner base particle comprises a silicon compound other than the organosilicon compound segment, the content ratio of the organosilicon compound segment relative to silicon compounds contained in the toner base particle is derived by carrying out solid $^{29}$Si-NMR measurements. In addition, a value obtained by multiplying the normalized intensity of silicon ions (m/z=28) by the content ratio thereof is regarded as the intensity corresponding to the organosilicon compound segment.

Solid $^{29}$Si-NMR Measurement Conditions

Apparatus: JNM-ECX500II produced by JEOL RESONANCE
Specimen tube: 3.2 mmφ
Specimen amount: 150 mg
Measurement temperature: room temperature
Pulse mode: CP/MAS
Measurement nucleus frequency: 97.38 MHz ($^{29}$Si)
Standard substance: DSS (external standard: 1.534 ppm)
Specimen rotation speed: 10 kHz
Contact time: 10 ms
Delay time: 2 s
Number of accumulations: 2000 to 8000

By carrying out the measurements described above, abundance ratios can be determined by peak separation and integration of a plurality of silane components according to the number of Si-bonded oxygen atoms by curve fitting.

A substance having at least one of the M unit, D unit or T unit structures below can be regarded as a condensation product of an organosilicon compound. A substance having a Q unit structure below can be regarded as a silicon compound other than a condensation product of an organosilicon compound.

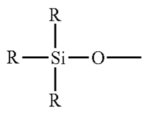

M unit

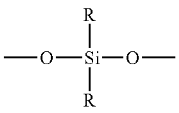

D unit

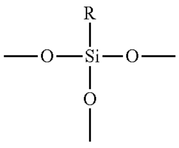

T unit

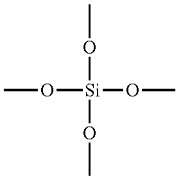

Q unit

Method for Obtaining Toner Particle by Removing External Additives from Toner

In cases where measurements are carried out on the surface of a toner having an external additive deposited on the surface thereof, measurements are carried out using the methods described above after obtaining a toner particle by removing external additives using the following procedure.

A 61.5% aqueous sucrose solution is prepared by adding 160 g of sucrose (available from Kishida Chemical Co., Ltd.) to 100 mL of ion exchanged water and dissolving the sucrose while immersing in hot water. A dispersed solution is prepared by placing 31.0 g of the concentrated sucrose solution and 6 g of Contaminon N (product name) (a 10 mass % aqueous solution of a neutral detergent for cleaning precision measurement equipment, which has a pH of 7 and comprises a non-ionic surfactant, an anionic surfactant and an organic builder, produced by Wako Pure Chemical Industries, Ltd.) in a centrifugal separation tube. 1.0 g of toner is added to this dispersed solution and lumps of the toner are broken into smaller pieces using a spatula or the like.

The centrifugal separation tube is shaken for 20 minutes at a rate of 300 spm (strokes per min) using a shaker. Following the shaking, the solution is transferred to a (50 mL) swing rotor glass tube and subjected to separation for 30 minutes at a speed of 3500 rpm using a centrifugal separator.

It is confirmed by visual inspection that toner particles are sufficiently separated from the aqueous solution and external additives settle at the bottom of the glass tube, and toner particles separated into the uppermost layer are collected using a spatula or the like. The collected toner particles are filtered using a vacuum filtration device and then dried for 1 hour or longer using a dryer. Toner particles are obtained by crushing the dried product with a spatula.

Method for Identifying Monomer Units in Binder Resin and Method for Measuring Content Ratios of Said Monomer Units The content ratios of monomer units in the binder resin are measured by means of $^1$H-NMR under the following conditions. A toner can be used as a measurement specimen.

Measurement apparatus: FT NMR apparatus (JNM-EX400 produced by JEOL Ltd.)

Measurement frequency: 400 MHz

Pulse conditions: 5.0 μs

Frequency range: 10,500 Hz

Number of accumulations: 64

Measurement temperature: 30° C.

Specimen: 50 mg of a measurement specimen is placed in a specimen tube having an internal diameter of 5 mm, deuterated chloroform ($CDCl_3$) is added as a solvent, and the measurement specimen is dissolved in a constant temperature bath at 40° C. The obtained $^1$H-NMR chart is analyzed and structures of monomer units are identified. By carrying out this identification, it is possible to confirm that the binder resin has certain monomer units.

As an example, measurement of the content ratio of a monomer unit represented by Formula (1) in the binder resin will now be described. From among peaks attributable to constituent elements of the monomer unit represented by Formula (1) in an obtained $^1$H-NMR chart, a peak that is independent from peaks attributable to constituent elements of other monomer units is selected, and the integrated value S1 of this peak is calculated. Integrated values are calculated in the same way for other monomer units contained in the binder resin.

In a case where monomer units that constitute the binder resin are the monomer unit represented by Formula (1) and one other monomer unit, the content of the monomer unit represented by Formula (1) is determined in the manner shown below using the integrated value S1 above and an integrated value S2 of the other monomer unit. Moreover, n1 and n2 denote the number of hydrogens in constituent elements attributable to peaks observed for the respective segments.

Content ratio (mol %) of monomer unit represented by Formula (1)=$\{(S1/n1)/((S1/n1)+(S2/n2))\}\times 100$ In cases where the number of other monomer units is 2 or more, the content of the monomer unit represented by Formula (1) can be calculated in the same way (using S3 . . . Sx, n3 . . . nx).

Moreover, in cases where a polymerizable monomer in which hydrogen is not contained in constituent components other than vinyl groups is used, $^{13}$C-NMR measurements are carried out in single pulse mode using $^{13}$C as a measurement atomic nucleus, and calculations are carried out in the same way as in $^1$H-NMR measurements. Content values of monomer units can be converted into mass percentages by multiplying the proportions (mol %) of the monomer units, which have been calculated using the method described above, by the molecular weights of these monomer units.

EXAMPLES

The present disclosure will now be explained in greater detail using the production examples and examples given below. However, these examples in no way limit the present disclosure. Moreover, in the production examples and examples, "parts" and "%" are all on a mass basis unless explicitly stated otherwise.

Production Example of Toner Base Particle-Dispersed Solution 1 Production of Aqueous Medium 1

11.2 parts of sodium phosphate (dodecahydrate) was placed in a reaction vessel containing 390.0 parts of ion exchanged water, and the reaction vessel was maintained at a temperature of 65° C. for 1.0 hours while being purged with nitrogen. The contents of the reaction vessel were stirred at 12,000 rpm using a T.K. Homomixer (produced by Tokushu Kika Kogyo Co., Ltd.). While continuing to stir the contents of the reaction vessel, an aqueous calcium chloride solution obtained by dissolving 7.4 parts of calcium chloride (dihydrate) in 10.0 parts of ion exchanged water was added all at once to the reaction vessel to prepare an aqueous medium containing a dispersion stabilizer. Aqueous medium 1 was then prepared by introducing 1.0 mol/L hydrochloric acid into the aqueous medium in the reaction vessel so as to adjust the pH to 6.0.

| Preparation of Colorant-dispersed Solution 1 | |
|---|---|
| Styrene: | 60.0 parts |
| C.I. Pigment Blue 15:3: | 6.3 parts |

A colorant-dispersed solution 1 in which a pigment was dispersed was prepared by introducing the materials listed above into an attritor (produced by Nippon Coke and Engineering Co., Ltd.) and then dispersing for 5.0 hours at 220 rpm using zirconia beads having diameters of 1.7 mm.

Preparation of Polymerizable Monomer Composition 1

Next, the materials listed below were added to colorant-dispersed solution 1.

| | |
|---|---|
| Styrene: | 16.0 parts |
| n-butyl acrylate: | 18.0 parts |
| Lauryl acrylate: | 6.0 parts |
| 1,6-hexane diol diacrylate: | 0.5 parts |
| Polyester resin: | 4.0 parts |

(A condensation polymerization product of terephthalic acid and an adduct of 2 moles of propylene oxide to bisphenol A; weight average molecular weight Mw=10,000; acid value: 8.2 mg KOH/g)

Ethylene glycol distearate: 15.0 parts

The materials listed above were held at a temperature of 65° C. and homogeneously dissolved and dispersed at 500 rpm using a T.K. Homomixer, thereby preparing polymerizable monomer composition 1.

Granulation Step

While maintaining the temperature of aqueous medium 1 at 70° C. and maintaining the rotation speed of a stirrer at 12,500 rpm, polymerizable monomer composition 1 was introduced into aqueous medium 1, and 9.0 parts of t-butyl peroxypivalate was added as a polymerization initiator. Granulation was carried out for 10 minutes while maintaining the rotation speed of the stirrer at 12,500 rpm.

Polymerization Step

The high speed stirrer was replaced by a stirring machine having a propeller type stirring blade, and a polymerization reaction was carried out for 5.0 hours while stirring at 200 rpm and maintaining a temperature of 70° C.

Next, the temperature was increased to 85° C., and a polymerization reaction was carried out by heating for 2.0 hours while stirring at 200 rpm. 0.03 parts of 3-methacryloxypropyltrimethoxysilane was then added, stirring was carried out for 5 minutes at 200 rpm, and a 1 mol/L aqueous solution of sodium hydroxide was then added to adjust the pH to 9.0. Residual monomer was then removed by increasing the temperature to 98° C. and heating for 3.0 hours while stirring at 200 rpm, and a temperature of 55° C. was maintained for 1.0 hours while continuing to stir.

The temperature was then lowered to 25° C. Ion exchanged water was added to the dispersed solution so that the concentration of toner base particles in the dispersed solution was 20.0%, thereby preparing toner base particle-dispersed solution 1, in which toner base particle 1 was dispersed. Physical properties of obtained toner base particle 1 are shown in Table 1-1.

Production Examples of Toner Base Particle-dispersed Solutions 2 to 6 and 8

Toner base particle-dispersed solutions 2 to 6 and 8 were obtained in the same way as in the production example of toner base particle-dispersed solution 1, except that numbers of parts and production conditions were altered as shown in Table 1-1 or Table 1-2. Physical properties of obtained toner base particles 2 to 6 and 8 are shown in Table 1-1 and Table 1-2.

Production Example of Toner Base Particle-Dispersed Solution 7 Production of Aqueous Medium 2

650.0 parts of ion exchanged water was placed in a reaction vessel equipped with a stirrer, a temperature gauge and a reflux tube, 14.0 parts of sodium phosphate (dodecahydrate) (produced by Rasa Industries, Ltd.) was added, and the reaction vessel was maintained at a temperature of 65° C. for 1.0 hours while being purged with nitrogen.

The contents of the reaction vessel were stirred at 15,000 rpm using a T.K. Homomixer (produced by Tokushu Kika Kogyo Co., Ltd.). While continuing to stir the contents of the reaction vessel, an aqueous calcium chloride solution obtained by dissolving 9.2 parts of calcium chloride (dihydrate) in 10.0 parts of ion exchanged water was added all at once to the reaction vessel to prepare an aqueous medium containing a dispersion stabilizer. Aqueous medium 2 was then obtained by introducing 10 mass % hydrochloric acid into the aqueous medium in the reaction vessel so as to adjust the pH to 5.0.

| Preparation Step of Colorant-dispersed Solution 2 | |
|---|---|
| Styrene: | 60.0 parts |
| C.I. Pigment Blue 15:3: | 6.5 parts |

The materials listed above were placed in an attritor (produced by Mitsui Miike Kakoki Corporation) and then dispersed for 5.0 hours at 220 rpm using zirconia beads having diameters of 1.7 mm so as to obtain colorant-dispersed solution 2.

Preparation Step of Polymerizable Monomer Composition 2

Next, the materials listed below were added to colorant-dispersed solution 2.

| | |
|---|---|
| Styrene: | 20.0 parts |
| n-butyl acrylate: | 20.0 parts |
| Crosslinking agent (divinylbenzene): | 0.3 parts |
| Saturated polyester resin: | 5.0 parts |

(A condensation polymer of propylene oxide-modified bisphenol A (2 mole adduct) and terephthalic acid (molar ratio 10:12); glass transition temperature Tg=68° C.; weight average molecular weight Mw=10,000; molecular weight distribution Mw/Mn=5.12)

Fischer Tropsch wax (melting point: 78° C.): 7.0 parts

These were held at a temperature of 65° C. and homogeneously dissolved and dispersed at 500 rpm using a T.K. Homomixer (produced by Tokushu Kika Kogyo Co., Ltd.), thereby preparing polymerizable monomer composition 2.

Granulation Step

While maintaining the temperature of aqueous medium 2 at 70° C. and maintaining the rotation speed of the T.K. Homomixer at 15,000 rpm, polymerizable monomer composition 2 was introduced into aqueous medium 2, and 10.0 parts of t-butyl peroxypivalate was added as a polymerization initiator. Granulation was carried out for 10 minutes while maintaining the rotation speed of the high speed stirrer at 15,000 rpm.

Polymerization/Distillation Step

Following the granulation step, the stirrer was replaced by a propeller type stirring blade, a polymerization reaction was carried out for 5.0 hours while stirring at 150 rpm and maintaining a temperature of 70° C., the temperature was then increased to 85° C., and a polymerization reaction was carried out by heating for 2.0 hours.

Next, the reflux tube in the reaction vessel was replaced by a condenser tube and distillation was carried out for 6 hours by heating the slurry to 100° C., thereby distilling off unreacted polymerizable monomer and obtaining toner base particle-dispersed solution 7.

TABLE 1-1

| | Toner base particle 1 | Toner base particle 2 | Toner base particle 3 | Toner base particle 4 | Toner base particle 5 |
|---|---|---|---|---|---|
| Monomer 1 | Styrene | Styrene | Styrene | Styrene | Styrene |
| Number of parts | 76.0 | 76.0 | 76.0 | 76.0 | 76.0 |
| Monomer 2 | n-butyl acrylate | n-butyl acrylate | n-butyl acrylate | n-butyl acrylate | n-butyl acrylate |
| Number of parts | 18.0 | 18.0 | 18.0 | 18.0 | 18.0 |
| Monomer 3 | Lauryl acrylate | Lauryl acrylate | Lauryl acrylate | Lauryl acrylate | Lauryl acrylate |
| Number of parts | 6.0 | 6.0 | 6.0 | 6.0 | 6.0 |
| Si Monomer | 3-methacryloxypropyl-trimethoxysilane | 3-methacryloxypropyl-methyldimethoxysilane | 3-methacryloxypropyl-tris (trimethylsiloxy)silane | 3-methacryloxypropyl-trimethoxysilane | 3-methacryloxypropyl-trimethoxysilane |
| Number of parts | 0.06 | 0.12 | 0.03 | 0.14 | 0.01 |

TABLE 1-1-continued

| | Toner base particle 1 | Toner base particle 2 | Toner base particle 3 | Toner base particle 4 | Toner base particle 5 |
|---|---|---|---|---|---|
| Number average particle diameter (D1) | 5.4 | 5.2 | 5.5 | 5.4 | 5.5 |
| Normalized intensity of silicon ions (m/z = 28) | 0.0098 | 0.0295 | 0.0019 | 0.0882 | 0.0007 |

TABLE 1-2

| | Toner base particle 6 | Toner base particle 7 | Toner base particle 8 |
|---|---|---|---|
| Monomer 1 | Styrene | Styrene | Styrene |
| Number of parts | 73.0 | 73.0 | 76.0 |
| Monomer 2 | n-butyl acrylate | n-butyl acrylate | n-butyl acrylate |
| Number of parts | 27.0 | 27.0 | 18.0 |
| Monomer 3 | — | — | Lauryl acrylate |
| Number of parts | — | — | 6.0 |
| Si Monomer | 3-methacryloxypropyl-trimethoxysilane | — | — |
| Number of parts | 0.06 | — | — |
| Number average particle diameter (D1) | 5.4 | 5.2 | 5.5 |
| Normalized intensity of silicon ions (m/z = 28) | 0.0098 | — | — |

Preparation of Organosilicon Compound Hydrolysis Liquid 1

A mixed liquid comprising 60 parts of ion exchanged water, which had been adjusted to a pH of 4.0 through addition of 1 mol/L hydrochloric acid, and 40 parts of methyltrimethoxysilane was mixed at 200 rpm using a stirrer until a uniform phase was formed, thereby obtaining organosilicon compound hydrolysis liquid 1.

Production Example of Toner 1

The temperature of the thus obtained toner base particle-dispersed solution 1 was increased to 55° C., the pH was adjusted to 8.0, 20 parts of an organosilicon compound hydrolysis liquid was added over a period of 10 minutes while mixing at 100 rpm using a propeller type stirring blade, and this state was then maintained for 10 minutes. Next, the pH was adjusted to 10.0 through addition of a 1 mol/L aqueous solution of sodium hydroxide, and this state was maintained for 3 hours while continuing the stirring.

Next, the pH was adjusted to 1.5 through addition of 1 mol/L hydrochloric acid, and stirring was carried out for 1 hour. Toner particle 1 was then obtained by filtering while washing with ion exchanged water, drying and then classifying. The obtained toner particle 1 was used as-is as toner 1. Physical properties of toner 1 are shown in Table 2-2.

Production Examples of Toners 2 to 16 and 18 to 19

Toners 2 to 16 and 18 to 19 were obtained in the same way as in the production example of toner 1, except that numbers of parts and production conditions were altered as shown in Table 2-1. Physical properties of obtained toners 2 to 16 and 18 to 19 are shown in Table 2-2.

Production Example of Toner 17

Preparation of Organosilicon Compound Hydrolysis Liquid 2

60.0 parts of ion exchanged water was weighed out into a reaction vessel equipped with a stirrer and a temperature gauge, and the pH was adjusted to 4.0 using 10 mass % hydrochloric acid. The temperature of this was increased to 40° C. by heating while stirring. Next, 40.0 parts of methyltriethoxysilane was added as an organosilicon compound, and hydrolysis was carried out while stirring for 2 hours or longer. The end point of the hydrolysis was visually confirmed by the fact that oil and water were not separated and formed a single layer, and this was then cooled to obtain organosilicon compound hydrolysis liquid 2.

After lowering the temperature of the obtained toner base particle-dispersed solution 7 to 55° C., 25.0 parts of organosilicon compound hydrolysis liquid 2 was added over a period of 1 minute, and polymerization of the organosilicon compound was initiated. This state was maintained for 60 minutes, after which the pH was adjusted to 5.5 using a 3.0% aqueous solution of sodium bicarbonate. After maintaining this state for 60 minutes while continuing to stir at 55° C., the pH was adjusted to 9.5 using a 3.0% aqueous solution of sodium bicarbonate, and this state was maintained for a further 4 hours to obtain a toner particle-dispersed solution.

Washing/Drying Step

Following completion of the polymerization step, the toner particle-dispersed solution was cooled, the pH was adjusted to 1.5 or lower through addition of hydrochloric acid, and the dispersed solution was then left for 1 hour while being stirred, and then subjected to solid-liquid separation using a pressure filter to obtain a toner cake. A slurry was formed from this toner cake using ion exchanged water so as to again form a dispersed solution, and solid-liquid separation was carried out using the filter mentioned above, thereby forming a toner cake.

The obtained toner cake was dried for 72 hours in a constant temperature chamber at 40° C., and then classified to obtain toner particle 17. The obtained toner particle 17 was used as-is as toner 17. Physical properties of toner 17 are shown in Table 2-2.

TABLE 2-1

| | Toner production conditions | | | | | | |
|---|---|---|---|---|---|---|---|
| | | | Condensation reaction 1 | | | Condensation reaction 2 | |
| | Toner base particle | Number of added parts | Addition time (min) | pH | Holding time (min) | pH | Holding time (h) |
| Toner 1 | Toner base particle 1 | 20.0 | 10 | 8.0 | 10 | 10.0 | 3.0 |
| Toner 2 | Toner base particle 2 | 18.0 | 10 | 8.0 | 10 | 10.0 | 3.0 |
| Toner 3 | Toner base particle 3 | 25.0 | 10 | 8.0 | 10 | 10.0 | 3.0 |
| Toner 4 | Toner base particle 1 | 19.0 | 5 | 8.0 | 10 | 10.0 | 3.0 |
| Toner 5 | Toner base particle 1 | 25.0 | 5 | 8.0 | 10 | 10.0 | 3.0 |
| Toner 6 | Toner base particle 1 | 25.0 | 1 | 8.0 | 10 | 10.0 | 3.0 |
| Toner 7 | Toner base particle 1 | 20.0 | 20 | 8.0 | 10 | 10.0 | 3.0 |
| Toner 8 | Toner base particle 1 | 18.0 | 20 | 8.0 | 10 | 10.0 | 3.0 |
| Toner 9 | Toner base particle 1 | 16.0 | 20 | 8.0 | 10 | 10.0 | 3.0 |
| Toner 10 | Toner base particle 4 | 16.0 | 10 | 8.0 | 10 | 10.0 | 3.0 |
| Toner 11 | Toner base particle 5 | 20.0 | 10 | 8.0 | 10 | 10.0 | 3.0 |
| Toner 12 | Toner base particle 1 | 18.0 | 1 | 5.5 | 10 | 11.0 | 3.0 |
| Toner 13 | Toner base particle 1 | 16.0 | 1 | 5.5 | 10 | 11.0 | 3.0 |
| Toner 14 | Toner base particle 1 | 25.0 | 10 | 5.5 | 30 | 10.0 | 3.0 |
| Toner 15 | Toner base particle 1 | 28.0 | 10 | 5.5 | 30 | 10.0 | 3.0 |
| Toner 16 | Toner base particle 6 | 20.0 | 10 | 8.0 | 10 | 10.0 | 3.0 |
| Toner 17 | Toner base particle 7 | 25.0 | 1 | 5.5 | 60 | 9.5 | 4.0 |
| Toner 18 | Toner base particle 7 | 20.5 | 1 | 5.5 | 60 | 9.5 | 4.0 |
| Toner 19 | Toner base particle 8 | 25.0 | 1 | 5.5 | 60 | 9.5 | 4.0 |

TABLE 2-2

| | Toner physical properties | | | | |
|---|---|---|---|---|---|
| | Average aspect ratio L/s | Average angle of inclination Δa (°) | Density Spd of protruded portions (protruded portions/μm²) | Weight average particle diameter D4 (μm) | Coverage ratio |
| Toner 1 | 3.6 | 1.5 | 50 | 7.2 | 0.60 |
| Toner 2 | 4.5 | 1.3 | 50 | 7.5 | 0.60 |
| Toner 3 | 1.5 | 1.9 | 50 | 7.3 | 0.60 |
| Toner 4 | 3.6 | 1.5 | 63 | 7.2 | 0.60 |
| Toner 5 | 3.6 | 1.5 | 70 | 7.2 | 0.60 |
| Toner 6 | 3.6 | 1.5 | 85 | 7.2 | 0.60 |
| Toner 7 | 3.6 | 1.5 | 30 | 7.2 | 0.60 |
| Toner 8 | 3.6 | 1.5 | 23 | 7.2 | 0.60 |
| Toner 9 | 3.6 | 1.5 | 18 | 7.2 | 0.60 |
| Toner 10 | 4.5 | 1.3 | 50 | 7.3 | 0.60 |
| Toner 11 | 1.3 | 2.0 | 50 | 7.4 | 0.60 |
| Toner 12 | 2.0 | 1.2 | 30 | 7.2 | 0.42 |
| Toner 13 | 2.0 | 1.2 | 30 | 7.2 | 0.35 |
| Toner 14 | 3.6 | 1.5 | 63 | 7.2 | 0.68 |
| Toner 15 | 3.6 | 1.5 | 63 | 7.2 | 0.72 |
| Toner 16 | 3.6 | 1.5 | 50 | 7.5 | 0.60 |
| Toner 17 | 1.1 | 2.5 | 63 | 7.2 | 0.60 |
| Toner 18 | 1.2 | 2.3 | 63 | 7.2 | 0.60 |
| Toner 19 | 1.1 | 2.5 | 63 | 7.2 | 0.60 |

In the tables 2-1 and 2-2, numbers of added parts indicate numbers of added parts of organosilicon compound hydrolysis liquid, and coverage ratio indicates the value of the ratio of Sc relative to S (Sc/S).

Image Evaluations

Image evaluations were carried out using a printer obtained by modifying parts of a commercially available HP LaserJet Enterprise Color M553dn color laser printer. As a result of the modifications, improvements were made so that the printer could be operated using only one color process cartridge. In addition, the printer was modified so that the potential setting was fixed at the initial potential setting of the process cartridge. Furthermore, the printer was modified so that the temperature of the fixing unit could be altered to an arbitrary temperature.

Toner was removed from a black toner process cartridge fitted to this color laser printer, the inside of this process cartridge was cleaned with an air blower, a toner (250 g) was placed in the process cartridge, the process cartridge filled with the toner was attached to the color laser printer, and the following image evaluations were carried out. Specific image evaluation items are as follows.

Transferability

In a normal temperature normal humidity environment (a temperature of 23° C. and a relative humidity of 60%), a solid image was outputted under conditions whereby the developing voltage was adjusted so that the toner laid-on level on a photoreceptor was 0.60 $mg/cm^2$, and untransferred toner on the photoreceptor when the solid image was formed was removed by taping with Mylar Tape.

A difference in reflectance was calculated by subtracting the reflectance of an article obtained by bonding only a tape to XEROX 4200 paper (produced by XEROX, 75 $g/m^2$) from the reflectance of an article obtained by bonding the peeled tape to the paper. Transferability was assessed from this difference in reflectance according to the evaluation criteria shown below. Moreover, reflectance was measured using a REFLECTMETER MODEL TC-6DS produced by Tokyo Denshoku Co., Ltd. A lower value indicates better transferability.

| Evaluation Criteria |
|---|
| A: Difference in reflectance of not more than 2.0% |
| B: Difference in reflectance of more than 2.0% and not more than 5.0% |
| C: Difference in reflectance of more than 5.0% and not more than 10.0% |
| D: Difference in reflectance of more than 10.0% |

Transfer Maintainability

Following completion of a test comprising printing out 100 images with horizontal lines at a print percentage of 1% in a normal temperature normal humidity environment (a temperature of 23° C. and a relative humidity of 60%), the difference in reflectance when the transferability evaluation described above was carried out was denoted as the initial difference in reflectance T1. In addition, following completion of a test in which 25,000 sheets were printed out in a normal temperature normal humidity environment (a temperature of 23° C. and a relative humidity of 60%), the difference in reflectance when the transferability evaluation described above was carried out was denoted as the difference in reflectance T2. Here, a value calculated as T2-T1 was evaluated as transfer maintainability.

| Evaluation Criteria |
|---|
| A: Transfer maintainability of not more than 0.5% |
| B: Transfer maintainability of more than 0.5% and not more than 1.0% |
| C: Transfer maintainability of more than 1.0% and not more than 5.0% |
| D: Transfer maintainability of more than 5.0% |

Low-Temperature Fixability

Solid images (toner laid-on level: 0.9 $mg/cm^2$) were printed at different fixing temperatures on transfer materials and evaluated using the criteria shown below. Moreover, the fixing temperature is a value measured using a non-contact temperature gauge at the surface of a fixing roller. Letter sized plain paper (XEROX 4200 produced by XEROX, 75 $g/m^2$) was used as a transfer material.

| Evaluation Criteria |
|---|
| A: No offsetting at 120° C. |
| B: Offsetting occurred at a temperature of 130° C. |
| C: Offsetting occurred at a temperature of 140° C. |
| D: Offsetting occurred at a temperature of 150° C. |

Fogging

Following completion of a test comprising printing out 100 images with horizontal lines at a print percentage of 1% in a normal temperature normal humidity environment (a temperature of 23° C. and a relative humidity of 60%), the reflectance (%) of non-image parts of images printed out after resting for 48 hours was measured using a REFLECTOMETER MODEL TC-6DS (produced by Tokyo Denshoku Co., Ltd.). Initial fogging was evaluated using a numerical value (%) determined by subtracting the obtained reflectance from the reflectance (%) of an unused sheet of printing paper (a reference paper), which was measured in the same way. A smaller numerical value means that image fogging is suppressed. The evaluation was carried out in glossy paper mode using plain paper (HP Brochure Paper 200 g, Glossy, produced by HP, 200 $g/m^2$).

In addition, after carrying out this printing test in the same way, except that the number of prints was changed from 100 to 25,000, fogging was evaluated after 25,000 prints.

| Evaluation Criteria |
|---|
| A: Less than 0.5% |
| B: At least 0.5% but less than 1.5% |
| C: At least 1.5% but less than 3.0% |
| D: At least 3.0% |

Examples 1 to 16

In Examples 1 to 16, toners 1 to 16 were used as toners and subjected to the evaluations described above. The evaluation results are shown in Table 3.

Comparative Examples 1 to 3

In Comparative Examples 1 to 3, toners 17 to 19 were used as toners and subjected to the evaluations described above. The evaluation results are shown in Table 3.

TABLE 3

| | | Transferability | | | Fogging | | |
|---|---|---|---|---|---|---|---|
| | | Initial T1 (%) | After 25,000 prints T2 (%) | Transfer maintainability (%) | Initial (%) | After 25,000 prints (%) | Low-temperature fixability (° C.) |
| Example 1 | Toner 1 | A(1.3) | A(1.7) | A(0.4) | A(0.3) | A(0.3) | A(115° C.) |
| Example 2 | Toner 2 | A(0.9) | A(1.3) | A(0.4) | A(0.4) | A(0.4) | A(115° C.) |
| Example 3 | Toner 3 | A(1.5) | A(1.8) | A(0.3) | A(0.3) | A(0.4) | A(115° C.) |
| Example 4 | Toner 4 | A(1.5) | A(1.8) | A(0.3) | A(0.3) | A(0.3) | A(115° C.) |
| Example 5 | Toner 5 | B(2.2) | B(2.5) | A(0.3) | A(0.3) | A(0.4) | A(115° C.) |
| Example 6 | Toner 6 | C(5.8) | C(6.2) | A(0.4) | A(0.2) | A(0.4) | A(115° C.) |
| Example 7 | Toner 7 | A(1.7) | A(1.8) | A(0.2) | A(0.3) | A(0.3) | A(115° C.) |
| Example 8 | Toner 8 | B(2.3) | B(2.7) | A(0.4) | A(0.2) | A(0.4) | A(115° C.) |
| Example 9 | Toner 9 | C(5.8) | C(6.6) | B(0.8) | A(0.3) | A(0.4) | A(115° C.) |
| Example 10 | Toner 10 | A(1.2) | A(1.4) | A(0.2) | A(0.3) | A(0.4) | B(130° C.) |
| Example 11 | Toner 11 | A(1.9) | C(5.1) | C(3.2) | A(0.4) | B(0.7) | A(115° C.) |

TABLE 3-continued

| | | Transferability | | | Fogging | | |
|---|---|---|---|---|---|---|---|
| | | Initial T1 (%) | After 25,000 prints T2 (%) | Transfer maintainability (%) | Initial (%) | After 25,000 prints (%) | Low-temperature fixability (° C.) |
| Example 12 | Toner 12 | A(1.3) | A(1.7) | A(0.4) | A(0.4) | A(0.4) | A(110° C.) |
| Example 13 | Toner 13 | A(1.3) | A(1.8) | A(0.5) | B(0.8) | B(1.3) | A(105° C.) |
| Example 14 | Toner 14 | A(1.4) | A(1.6) | A(0.2) | A(0.3) | A(0.3) | B(130° C.) |
| Example 15 | Toner 15 | A(1.4) | A(1.8) | A(0.4) | A(0.2) | A(0.2) | C(140° C.) |
| Example 16 | Toner 16 | A(1.3) | A(1.7) | A(0.4) | A(0.3) | A(0.3) | C(140° C.) |
| Comparative Example 1 | Toner 17 | A(1.8) | D(11.0) | D(9.2) | A(0.3) | A(0.3) | C(140° C.) |
| Comparative Example 2 | Toner 18 | A(1.9) | D(10.5) | D(8.6) | A(0.3) | A(0.4) | C(140° C.) |
| Comparative Example 3 | Toner 19 | A(1.8) | D(11.5) | D(9.7) | B(1.2) | C(2.2) | A(115° C.) |

In the table, the temperature in the "Low-temperature fixability" row indicates the temperature at which offsetting occurred.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-113902, filed Jul. 15, 2022 which is hereby incorporated by reference herein in its entirety.

What is claimed is:

1. A toner, comprising:

a toner particle comprising a toner base particle;

the toner base particle comprising a binder resin;

the toner base particle having an organosilicon polymer at a surface thereof; and protruded portions constituted by the organosilicon polymer being present at the surface of the toner base particle, wherein an average aspect ratio of protrusion x is 1.3 or more when protrusion x is a protruded portion having a height of 30 to 200 nm among the protruded portions and is observed in a normal direction from the surface of the toner particle using a scanning electron microscope, and an average angle of inclination Δa is 1.0 to 2.0° when shape measurements of a region measuring 1 $\mu m^2$ at the surface of the toner particle are carried out using an atomic force microscope and measured data obtained by observing the protruded portions at the surface of the toner particle is subjected to surface roughness analysis.

2. The toner according to claim 1, wherein a density Spd of protruded portions having peak heights of at least ¾ of Sp is 17 to 93 protruded portions/$\mu m^2$ when Sp (nm) is a maximum peak height of the protruded portions in the surface roughness analysis.

3. The toner according to claim 2, wherein Spd is 25 to 65 protruded portions/$\mu m^2$.

4. The toner according to claim 1, wherein the toner base particle comprises an organosilicon compound segment, and the normalized intensity of silicon ions (m/z=28) is 0.0008 to 0.0800 obtained by measuring the toner base particle using time of flight secondary ion mass spectrometry.

5. The toner according to claim 1, wherein (Sc/S) is 0.40 to 0.70 when S is a total area of the surface of the toner particle and Sc is an area of those regions of the surface of the toner particle where the surface of the toner base particle is coated with the organosilicon polymer.

6. The toner according to claim 1, wherein the binder resin comprises a styrene acrylic resin having a monomer unit represented by Formula (1):

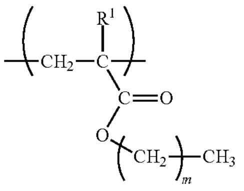

(1)

where $R^1$ denotes a hydrogen atom or a methyl group, and m denotes an integer of 10 to 22.

7. The toner according to claim 1, wherein the binder resin comprises a structure represented by Formula (3)

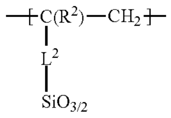

(3)

where $L^2$ denotes $-COO(CH_2)_n-$, n denotes an integer of 1 to 10, a carbonyl group in $L^2$ bonds to a carbon atom having $R^2$ in the main chain, and $R^2$ denotes a hydrogen atom or a methyl group.

* * * * *